US007992152B2

United States Patent
Hashimoto et al.

(10) Patent No.: US 7,992,152 B2
(45) Date of Patent: Aug. 2, 2011

(54) SERVER/CLIENT SYSTEM, LOAD DISTRIBUTION DEVICE, LOAD DISTRIBUTION METHOD, AND LOAD DISTRIBUTION PROGRAM

(75) Inventors: Taro Hashimoto, Tokyo (JP); Tetsuya Onoda, Tokyo (JP)

(73) Assignee: G-Cluster Global Corporation, Tokyo (JP)

( * ) Notice: Subject to any disclaimer, the term of this patent is extended or adjusted under 35 U.S.C. 154(b) by 1432 days.

(21) Appl. No.: 10/583,358

(22) PCT Filed: Dec. 18, 2003

(86) PCT No.: PCT/JP03/16252
§ 371 (c)(1), (2), (4) Date: Jun. 19, 2006

(87) PCT Pub. No.: WO2005/062176
PCT Pub. Date: Jul. 7, 2005

(65) Prior Publication Data
US 2007/0118630 A1 May 24, 2007

(51) Int. Cl.
G06F 9/46 (2006.01)
G06F 15/16 (2006.01)
(52) U.S. Cl. ........................ 718/105; 709/203
(58) Field of Classification Search .................. 718/105; 709/203
See application file for complete search history.

(56) References Cited

U.S. PATENT DOCUMENTS

| 5,341,477 A * | 8/1994 | Pitkin et al. ............... 709/226 |
| 6,463,454 B1 * | 10/2002 | Lumelsky et al. ............ 718/105 |
| 7,320,131 B1 * | 1/2008 | O'Toole, Jr. .................. 718/104 |
| 2001/0039581 A1 | 11/2001 | Deng et al. |
| 2004/0167959 A1 | 8/2004 | Doyle et al. |

FOREIGN PATENT DOCUMENTS

| EP | 0 384 339 A2 | 8/1990 |
| EP | 1 170 663 A2 | 1/2002 |
| JP | 7-093262 A | 4/1995 |
| JP | 10-198643 A | 7/1998 |
| JP | 10-307783 A | 11/1998 |
| JP | 2000-047890 A | 2/2000 |

(Continued)

OTHER PUBLICATIONS

W. Leinberger et al., "Multiple Resource Requirements," Supercomputing, ACM/IEEE 1999 Conference, Nov. 13, 1999, pp. 47-61.

(Continued)

Primary Examiner — Meng A An
Assistant Examiner — Brian Chew
(74) Attorney, Agent, or Firm — Foley & Lardner LLP

(57) ABSTRACT

In a server/client system in which a plurality of servers and a client are connected through a network, and process-executing servers execute a process based on a process request from the client and transmit a process result to the client, a load distribution device includes a process information receiving unit that receives information on the process from the client; a determining unit that determines a server to execute the process from among the process-executing servers based on the information on the process; and a server information transmitting unit that transmits information on determined servers to the client, and the client includes a server information receiving unit that receives transmitted information on the servers; and a process request transmitting unit that transmits the process request to the determined servers.

8 Claims, 15 Drawing Sheets

FOREIGN PATENT DOCUMENTS

| | | |
|---|---|---|
| JP | 2000-112908 A | 4/2000 |
| JP | 2002-269061 A | 9/2002 |
| JP | 3472540 B2 | 9/2003 |
| JP | 2004-252975 A | 9/2004 |
| KR | 2003-0046911 A | 6/2003 |

OTHER PUBLICATIONS

Lap-Sun Cheung et al., "The Design and Performance of an Intelligent Jini Load Balancing Service," 2001 International Conference on Parallel Processing Workshops, Sep. 3, 2001, pp. 361-366.

* cited by examiner

| ID | PROCESS NAME | USED AMOUNT OF CPU | USED AMOUNT OF MEMORY |
|---|---|---|---|
| 100 | PROCESS 1 | 0.15 | 0.2 |
| 110 | PROCESS 2 | 0.2 | 0.4 |
| ... | | | |

| CONNECTION DESTINATION SERVER NAME | USE RATE OF CPU | USE RATE OF MEMORY |
|---|---|---|
| 101b | 0.9 | 0.88 |
| 101c | 0.5 | 0.2 |
| 101d | 0.3 | 0.2 |
| . . . | | |

SERVER/CLIENT SYSTEM, LOAD DISTRIBUTION DEVICE, LOAD DISTRIBUTION METHOD, AND LOAD DISTRIBUTION PROGRAM

TECHNICAL FIELD

The present invention relates to a server/client system, a load distribution device, a load distribution method, and a load distribution program that distribute accesses to servers, and more particularly to a server/client system, a load distribution device, a load distribution method, and a load distribution program that select the optimal server from plural servers by monitoring and evaluating an operation state of the servers.

BACKGROUND ART

Conventionally, a server-client-type system in which a request for execution of a server program is made, to a server, by an application program on a client through a network is used. In this system, in response to the request for executing a program from a client, the server that provides a service resulted from executing the program starts up a process that is a processing unit of the program to provide the service. When a process of a web content distributing program, business operation software, game software, etc. is started on the server, a service in a form of, for example, text data, image data, etc., is provided to the client who has made the request to the service.

When a processing in such a server/client system is executed by plural servers, a technique that distributes loads of a processing requested from the client is used to prevent the loads from concentrating on some of servers. For example, in a case of web servers that distribute web contents, servers to be assigned to execute a processing are selected using schemes such as a round robin scheme that shares processing of accesses from clients sequentially to servers prepared and a least connection scheme that selects from the servers the server that has the minimal number of sessions.

When the loads is distributed in the round-robin scheme or the least connection scheme, the servers are to be assigned regardless of amount of resources (resources retained by a personal computer such as a CPU, a memory, etc.) to be consumed by execution of the process or amount of resources retained by the servers.

FIG. 19 is an explanatory view showing an example of a relation between an amount of resource retained by a server and an amount of resource consumed by a process. In FIG. 19, the X-coordinate represents an amount of CPU of the server and the Y-coordinate represents an amount of memory of the server that are consumed to execute a server program. "Xmax" on the X-coordinate shown in FIG. 19 represents "100%" that is the maximum value of the consumption of the CPU, and "Ymax" on the Y-coordinate represents "100%" that is the maximum value of the consumption of the memory. An ideal position at which the CPU and the memory are respectively consumed 100% is represented by coordinates 1902. When a process 1901 that consumes the CPU and the memory is executed on this server, the consumption of the memory becomes 100% even though the consumption of the CPU is less than 100%.

FIG. 20 is an explanatory view showing another example of the relation between the amount of resource retained by a server and the amount of resource consumed by a process. In FIG. 20, similarly to FIG. 19, the X-coordinate represents an amount of CPU of the server and the Y-coordinate represents an amount of memory of the server that are consumed to execute a server program. "Xmax" on the X-coordinate represents "100%" that is the maximum value of the consumption of the CPU, and "Ymax" on the Y-coordinate represents "100%" that is the maximum value of the consumption of the memory. An ideal position at which the CPU and the memory are respectively consumed 100% is represented by coordinates 2002. When a process 2001 that consumes the CPU and the memory is executed on this server, contrary to the case shown in FIG. 19, the consumption of the CPU becomes 100% even though the consumption of the memory is less than 100%.

Such a system exists that a load distribution device grasps the number of sessions in each of servers, and selects a suitable server from among servers to assign a session based on the numbers of sessions and weights determined respectively based on a machine performance of each of the servers (for example, Japanese Patent Application Laid-Open Publication No. 2002-269061).

However, in the load distribution according to the round robin scheme or the least connection scheme described above, the load is distributed based on the number of sessions with clients thereof regardless of the resources retained by the servers and the resources to be consumed by the process. Thus, sufficiency of the resource is judged when the process that has been requested to be executed is started on the server. As a result, delay occurs in responding to the request, and a latency time occurs to the client.

On the other hand, because the amount of resource that is retained by each server differs according to a performance of each device to be used as a server, amounts of used resources after distributing the load is not considered when a scheme of load distribution simply based on the numbers of sessions such as the round robin scheme, the least connection scheme, etc., is used. Therefore, a process can be assigned to a server that has a small amount of resource left or to a server that has unbalanced consumption of the resources.

Moreover, when a server in which consumption is concentrated on either of the CPU and the memory is caused to execute a process, a new process can not be executed even though a resource that has smaller consumption has an empty region because only a resource region that has a larger consumption is not sufficient. Therefore, such server that has unbalanced consumption of resources can execute fewer processes compared to a server in which resources are consumed equally.

It is an object of the present invention to solve the problems in the conventional techniques described above, and to provide a server/client system, a load distribution device, a load distribution method, and a load distribution program that can select an optimal server from among plural servers installed at one or more locations by numerically evaluating resources and operational states of the servers to be assigned to a process, and can cause each of the servers execute the process efficiently.

DISCLOSURE OF INVENTION

To solve the above problems, in a server/client system according to the present invention, a plurality of servers and a plurality of clients are connected through a network, and the servers execute a process based on a process request from the client and transmit a process result to the client. At least one of the servers includes a process information receiving unit that receives information on the process from the client through the network; a determining unit that determines servers to execute the process from the servers based on the information on the process received by the process information receiving unit; and a server information transmitting unit that transmits information on the servers determined by the determining unit to the client. The client includes a server information receiving unit that receives the information on the servers transmitted by the server information transmitting unit through the network; and a process request transmitting unit that transmits the information on the request for execution of the process to the servers received by the server information receiving unit.

Moreover, a load distribution device according to the present invention is used in a server/client system in which a plurality of servers and a plurality of clients are connected through a network, and the servers execute a process based on a process request from the client and transmit a process result to the client. The load distribution device includes a process information receiving unit that receives information on the process from the client through the network; a determining unit that determines servers to execute the process from the servers based on the information on the process received by the process information receiving unit; and a server information transmitting unit that transmits information on the servers determined by the determining unit to the client.

Furthermore, a load distribution method according to the present invention is a method of distributing loads of servers used in a server/client system in which a plurality of servers and a plurality of clients are connected through a network, and the servers execute a process based on a process request from the client and transmit a process result to the client. The load distribution method includes receiving information on the process from the client through the network; determining servers to execute the process from the servers based on the information on the process received at the receiving; and transmitting the information on the request for execution of the process to the servers determined at the determining.

Moreover, a load distribution program according to the present invention is a program for distributing loads of servers in a server/client system in which a plurality of servers and a plurality of clients are connected through a network, and the servers execute a process based on a process request from the client and transmit a process result to the client. The load distribution program makes the servers execute receiving information on the process from the client through the network; determining servers to execute the process from the servers based on the information on the process received at the receiving; and transmitting the information on the request for execution of the process to the servers determined at the determining.

The determining unit (step) includes a first calculating unit (step) configured to calculate, for each of the servers, a first distance from an estimation point indicating an estimated consumption to an ideal consumption line, the estimated consumption obtained by adding an amount of resource to be consumed by execution of the process to a point indicating an amount of resource that has been consumed by each of the servers, the ideal consumption line being a straight line that connects an origin and a point indicating a maximum resource capacity of each of the servers expressed in a space having parameters of resource as axes; and a second distance calculating unit (step) configured to calculate, for each of the servers, a second distance from the estimated point to the origin in the space. The determining unit (step) is configured (includes) to determine the server based on at least one of the first distance and the second distance.

Furthermore, the parameters may include at least one of a load amount of a central processing unit, a load amount of a system memory, a load amount of a graphic processing unit, a load amount of a video memory, and a load amount of a network interface card.

BRIEF DESCRIPTION OF DRAWINGS

FIG. 17 is an explanatory view showing an example of a table retaining information on the servers of the server/client system according to the embodiment of the present invention;

BEST MODE(S) FOR CARRYING OUT THE INVENTION

Exemplary embodiments of a server/client system, a load distribution device, a load distribution method, and a load distribution program according to the present invention will be described below in detail with reference to the accompanying drawings.
(System Configuration)

Figure 1:
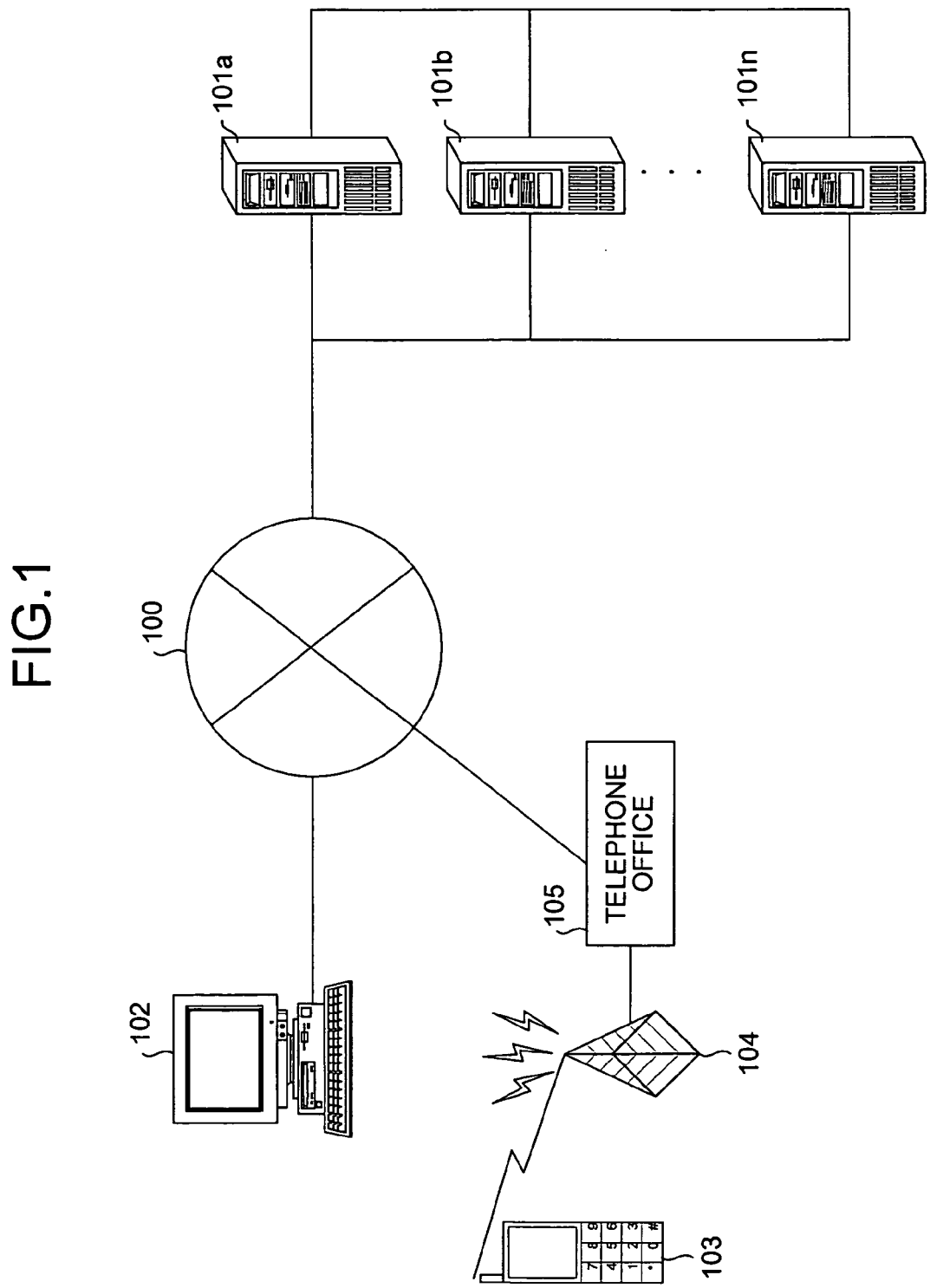
FIG. 1 is a schematic diagram of a system configuration of a server/client system according to an embodiment of the present invention.

The system configuration of a server/client system including a load distribution device according to an embodiment of the present invention will be described. FIG. 1 is a schematic diagram of a system configuration of a server/client system according to an embodiment of the present invention. As shown in FIG. 1, servers 101a to 101n are configured to be connected through a network 100 such as the Internet, respectively with a terminal device (client) 102 or a telephone office 105. The telephone office 105 is connected to a radio base station 104 and a mobile phone 103 is connected through this radio base station 104 with the servers 101a to 101n.

The servers 101a to 101n are, for example, personal computers used for a use as servers called PC servers, and are administered and operated by a service business entity that performs distribution of web contents and distribution of network games. A PC server is altered to a load distribution device having a load distributing function, by installing dedicated application software into the PC server. One or more server(s) having a load distributing function can be provided in one entire system. The server 101a will be described below as a load distribution device.

Therefore, servers (process processing servers) 101b to 101n other than the server 101a can also be altered to a load distribution devices respectively having a load distributing function by installing dedicated application software into those servers 101b to 101n and, when the server 101a that has been started up as a load distribution device 101a stops the operation thereof due to a fault, any one of the servers 101b to 101n can be switched to as and can substitute for the load distribution device 101a.

When a request for execution of a process is sent from the terminal device 102 or the mobile phone 103 described later that is used by a user, the load distribution device 101a assigns the execution of the process to the servers 101b to 101n. The servers 101b to 101n execute the requested process and provide through the network 100 services resulted from the execution, to the terminal device 102 or the mobile phone 103 described later.

The terminal device 102 is, for example, an information terminal device, such as a personal computer, etc., and is used by an individual or in a company. The mobile phone 103 is, for example, a mobile phone that is equipped with an information communicating function, such as "i-mode (R)" by NTT DoCoMo Inc. or "EZweb (R)" by au, that can access at least the Internet and can access the network 100 using a browser or a Java (R) application. The radio base station 104 converts communication data received from the telephone office 105 into a radio wave and transmits the radio wave to the mobile phone 103, and transmits a radio wave received from the mobile phone 103 to the telephone office 105. The telephone office 105 switches lines when data communication is executed between the mobile phone 103, and the load distribution device 101a and the servers 101b to 101n.

The system for the mobile phone 103 can be regarded as a system for so-called a "hot spot service" when it is assumed that the mobile phone is replaced by a notebook computer or a PDA attached with/containing a radio LAN adaptor, and the radio base station 104 of the mobile phone is replaced by a radio LAN base station.

In the communication executed among the load distribution device 101a, the servers 101b to 101n, the terminal device 102, or the mobile phone 103 through the network 100, it is preferable that confidentiality protection is secured using a security function employing an SSL scheme, etc., or an encrypting technique, etc.
(Hardware Configuration)

Figure 2:
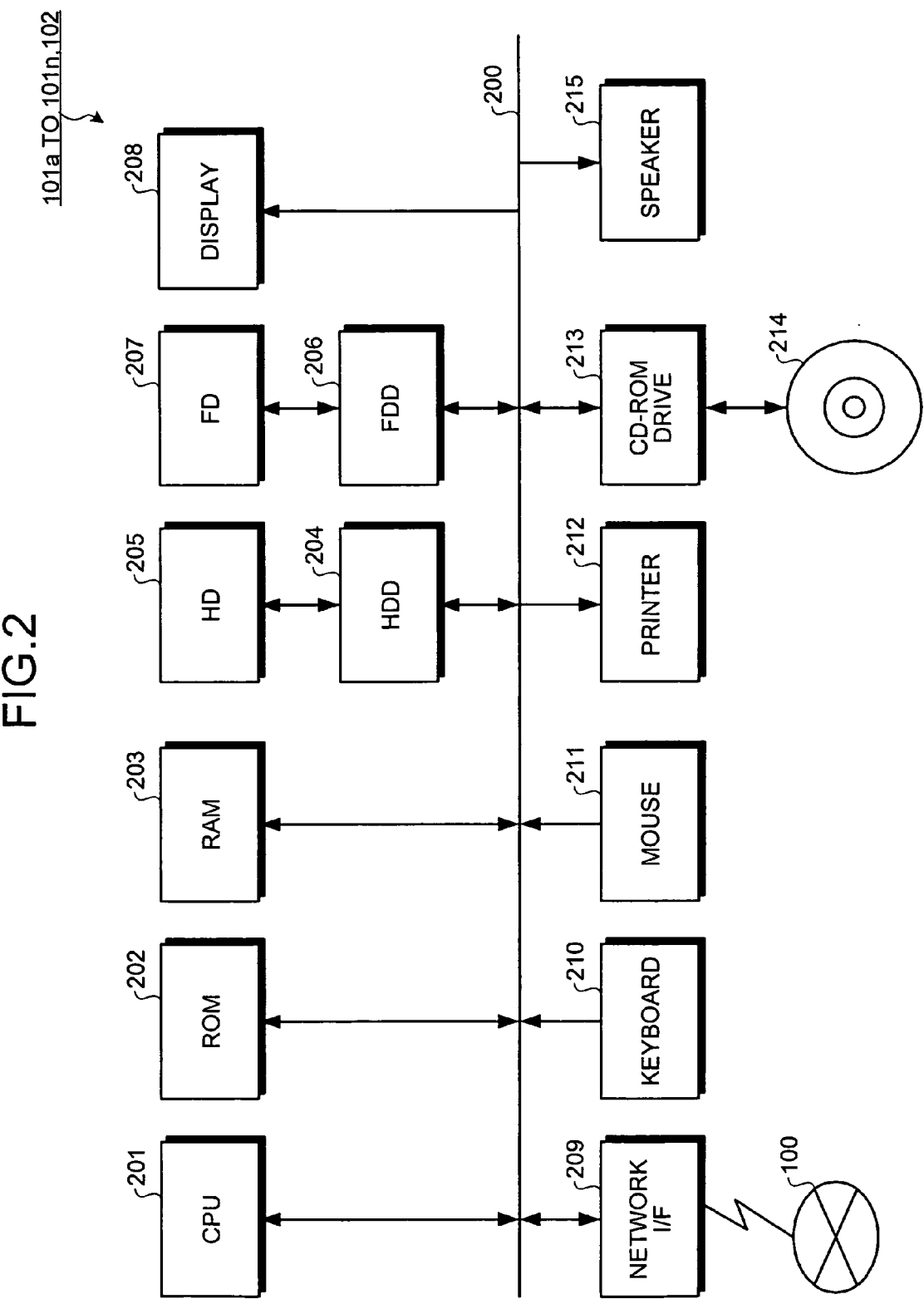
FIG. 2 is a block diagram of a hardware configuration of a load distribution device, a terminal device, and a server of the server/client system according to the embodiment of the present invention.

The hardware configurations of the terminal device and the servers according to the embodiment of the present invention will be described. FIG. 2 is a block diagram of a hardware configuration of the load distribution device, the terminal device, and the servers of the server/client system according to the embodiment of the present invention.

As shown in FIG. 2, the terminal device 102, the load distribution device 101a, and the servers 101b to 101n respectively include a CPU 201, a ROM 202, a RAM 203, an HDD (hard disk drive) 204, an HD (hard disk) 205, an FDD (flexible disk drive)206, an FD (flexible disk) 207 as an example of a removable recording medium, a display 208, a network I/F (Interface) 209, a keyboard 210, a mouse 211, a printer 212, a CD-ROM drive 213, a CD-ROM 214 as an example of a removable recording medium 214, and a speaker 215. Each component is connected by a bus 200 with each other.

The CPU 201 administers the control of the entire terminal device 102, the entire load distribution device 101a, and the entire servers 101b to 101n. The ROM 202 stores programs such as the basic input/output programs, a boot program, etc. The RAM 203 is used as a work area of the CPU 201. The HDD 204 controls reading/writing of data from/to the HD 205 according to a control of the CPU 201. The HD 205 stores data written according to a control of the HDD 204.

The FDD 206 controls reading/writing of data from/to the FD 207 according to the control of the CPU 201. The FD 207 stores the data written by the control of the FDD 206. As a removable recording medium, a CD-RW, an MO, a DVD (digital versatile disk), etc., may be used in addition to the FD 207. The display 208 displays a cursor, menus, or windows (browsers) relating to data such as texts, images, functional information, etc., and is a CRT, a TFT liquid crystal display, a plasma display, etc.

The network I/F 209 is connected to the network 100 and is connected to the terminal device 102 through this network 100. The network I/F 209 administers the interface between the network 100 and the internal portion of the system, and controls input/output of data from the load distribution device 101a, the servers 101b to 101n, and the terminal device 102. For example, a modem, a LAN adapter, etc., may be employed as the network I/F 209.

The keyboard 210 includes keys for inputting letters, numerical values, various instructions, etc., and executes input of data. The mouse 211 executes move of the cursor, selection of a region, or shift and size change of windows. The mouse 211 may be a track ball, a joy stick, a game pad, etc., that similarly includes the function as a pointing device. The printer 212 prints text data. For example, a laser printer, an ink jet printer, etc., may be employed as the printer 212. The CD-ROM drive 213 controls reading of data to the CD-ROM 214 according to the control of the CPU 201. The CD-ROM 214 is a removable recording medium. The speaker 215 (including a headphone or an earphone) outputs sound, music, etc.

Figure 3:
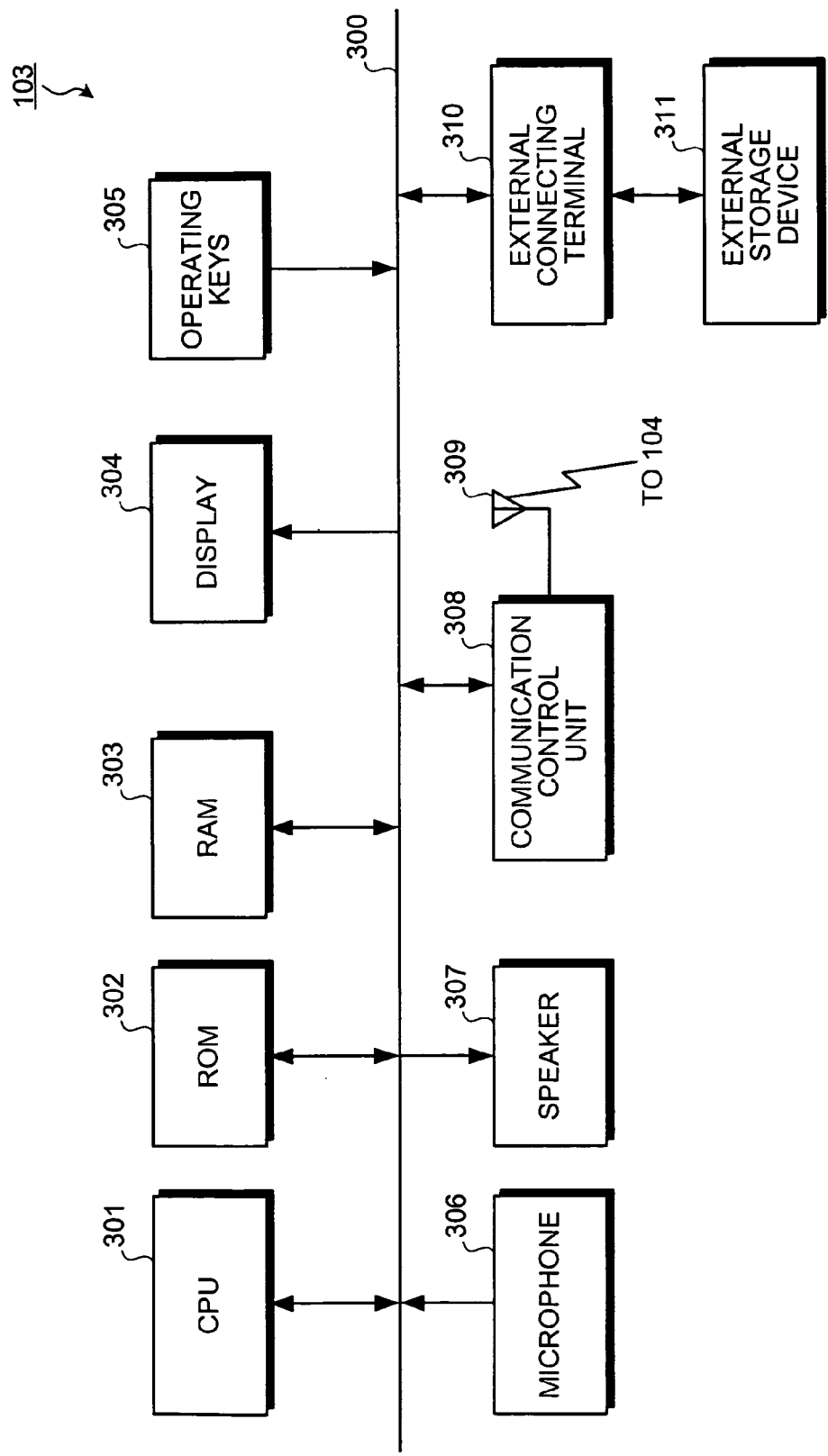
FIG. 3 is a block diagram of a hardware configuration of a mobile phone of the server/client system according to the embodiment of the present invention.

A hardware configuration of the mobile phone according to the embodiment of the present invention will be described. FIG. 3 is a block diagram of the hardware configuration of the mobile phone of the server/client system according to the embodiment of the present invention. As shown in FIG. 3, the mobile phone 103 includes a CPU 301, a ROM 302, a RAM 303, a display 304, operating keys 305, a microphone 306, a speaker 307, a communication control unit 308, an antenna 309, an external connecting terminal 310, and an external storage device 311. The antenna 309 is communicatively connected to the radio base station 104. Each component is respectively connected to each other by a bus 300.

The CPU 301 administers the control of the entire mobile phone 103. The ROM 302 stores programs such as the basic input/output programs, a boot program, etc. The RAM 303 is used as a work area of the CPU 301. The display 304 is a liquid crystal display and displays windows (browsers) relating to data such as texts, images, functional information, etc. The operating keys 305 input letters, digits, various instructions, etc. The microphone 306 converts input voices into an electric signal. The speaker 307 converts the input electric signal into the voices and outputs the voices. The communication control unit 308 transmits/receives electromagnetic waves to/from the radio base station 104 through the antenna 309 and performs a control thereof. The external connecting terminal 310 is a connecting point with the external storage device 311 such as a flash memory, etc.

(Functional Configuration)

Figure 4:
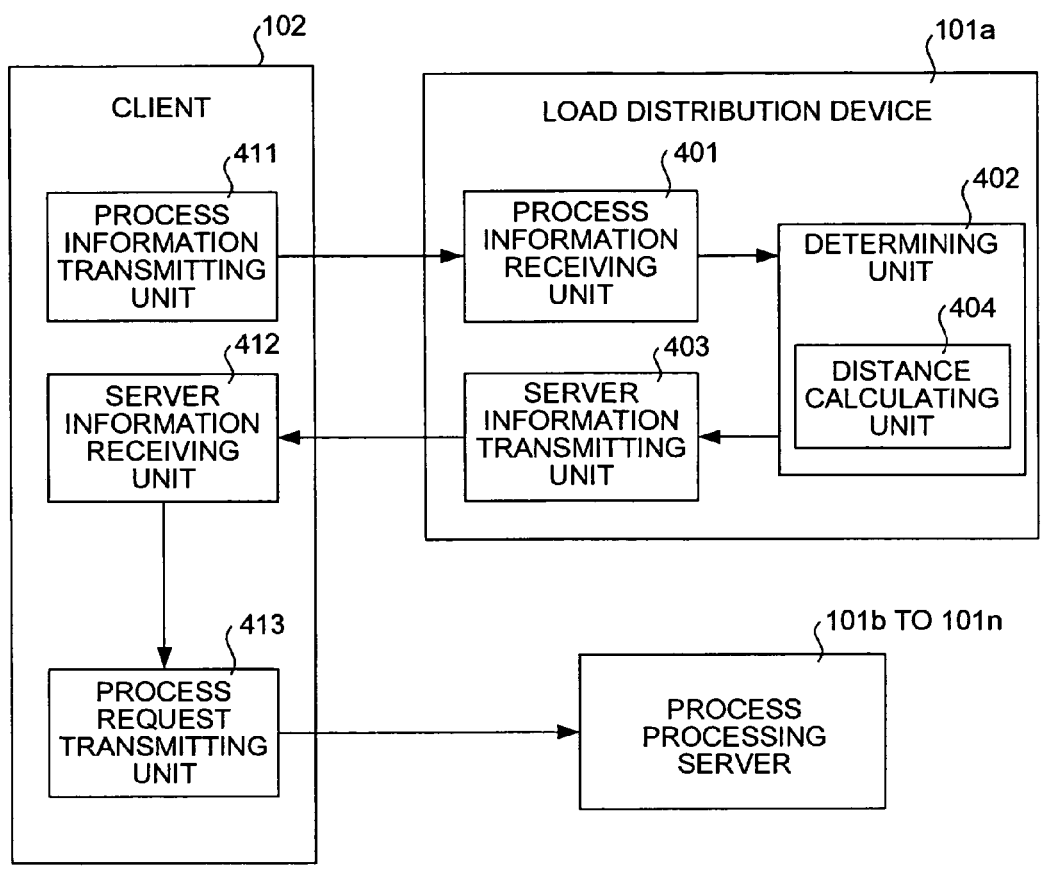
FIG. 4 is a block diagram of a functional configuration of the server/client system according to the embodiment of the present invention.

A functional configuration of the server/client system according to the embodiment of the invention will be described. FIG. 4 is a block diagram of the functional configuration of the server/client system according to the embodiment of the present invention. As shown in FIG. 4, the load distribution device 101a constituting the server/client system includes a process information receiving unit 401, a determining unit 402, and a server information transmitting unit 403. The determining unit 402 includes a distance calculating unit 404. The client 102 constituting the server/client system includes a process information transmitting unit 411, a server information receiving unit 412, and a process request transmitting unit 413.

The process information receiving unit 401 receives information on the process from the client 102 through the network 100. The determining unit 402 determines servers to be caused to process the process from plural process-processing servers 101b to 101n based on the information on the process received by the process information receiving unit 401. The distance calculating unit 404 calculates distances between the resource consumption of the process and a straight line connecting the origin and the maximum available capacities of the parameters in a space having parameters of resources as the axes thereof. The servers to be caused to execute the process are determined based on the distances calculated by the distance calculating unit 404. The server information transmitting unit 403 transmits the information on the servers determined by the determining unit 402 to the client 102.

On the other hand, the process information transmitting unit 411 transmits the information on the process to the load distribution device 101a through the network 100 before requesting the process. The server information receiving unit 412 receives through the network 100 the information on the servers transmitted by the server information transmitting unit 403 of the load distribution device 101a. The process request transmitting unit 413 transmits information on a request for processing the process to the servers relating to the information received by the server information receiving unit 412, that is, the servers determined by the determining unit 402 of the load distribution device 101a (any of the process-processing servers 101b to 101n). The above servers process based on this process request and transmit the processing results to the client 102.

(Processing Procedure of Load Distribution)

Figure 5:
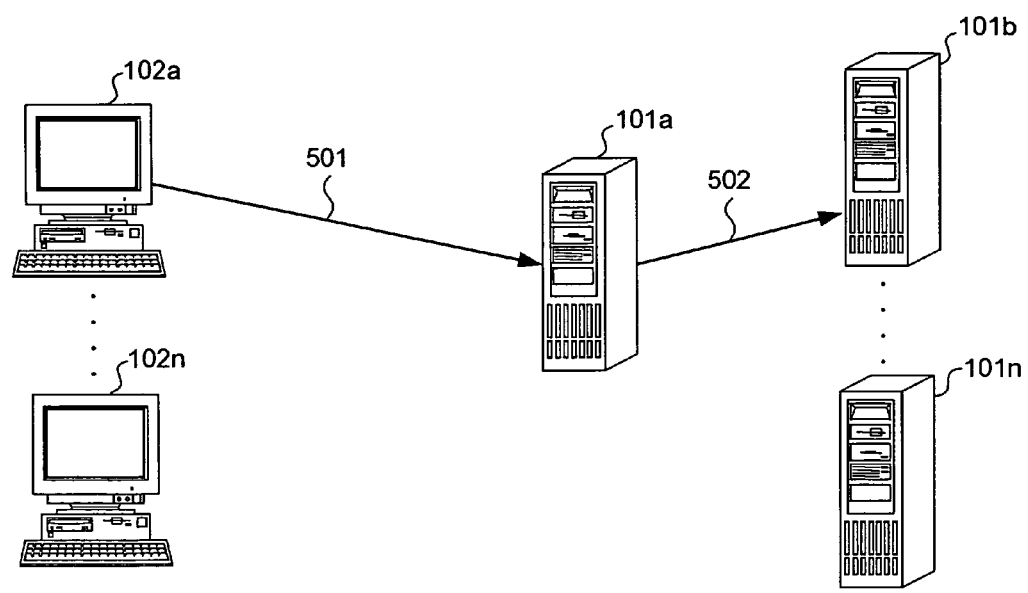
FIG. 5 is an explanatory view showing an outline of a procedure of a load distribution method using the load distribution device according to the embodiment of the present invention.

An outline of a procedure of a load distribution method using the load distribution device 101a according to the embodiment of the present invention will be described. FIG. 5 is an explanatory view showing the outline of the procedure of a load distribution method using the load distribution device according to the embodiment of the present invention. As shown in FIG. 5, the load distribution device 101a distributes the load for executing a process (for example, a game process such as an online game, etc.) requested from the terminal devices 102a to 102n, and assigns the distributed loads respectively to the servers 101b to 101n.

When an online game is played using the terminal device 102a, execution of the game process is requested as indicated by an arrow 501 from the terminal device 102a to the load distribution device 101a. The load distribution device 101a that has been requested to execute the process, evaluates game servers to be caused to execute the game process from the servers 101b to 101n. The game servers are evaluated based on the resources retained by each of the servers 101b to 101n. As a result of the evaluation by the load distribution device 101a, the server 101b is determined as the load distribution destination as indicated by an arrow 502. When the game server is determined, execution of the game process is requested from the load distribution device 101a and the game process is executed in the server 101b. Thus, the game can be started to be used by the terminal device 102a.

As described above, the load distribution device 101a is triggered, by the fact that the execution of the game process is requested from the terminal devices 102a to 102n, to select the optimal server to execute this game process from the servers 101b to 101n. Not limiting to such an online game as described above, when a process by another application software is executed, the load can be distributed using the load distribution device 101a.

Figure 6:
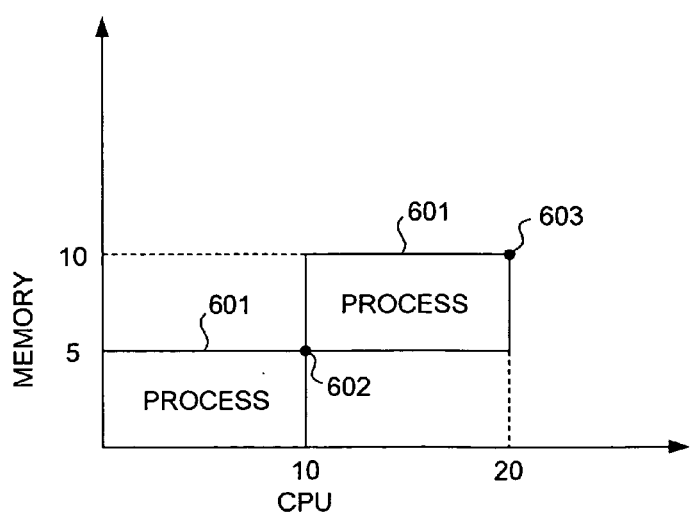
FIG. 6 is an explanatory view showing an example of an ideal process assignment according to the embodiment of the present invention.
Figure 7:
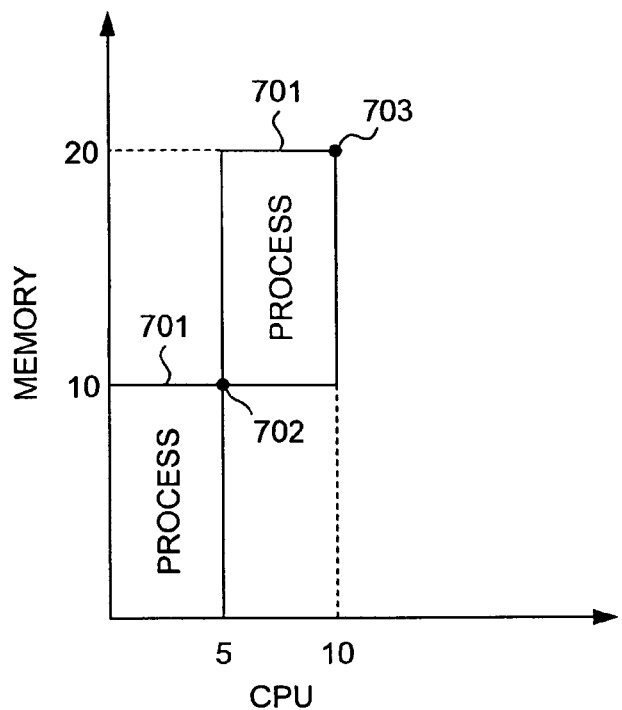
FIG. 7 is an explanatory view showing another example of the ideal process assignment according to the embodiment of the present invention.

The relation between the resource amounts of the server and the resource amounts consumed by the process according to the embodiment of the present invention will be described. FIG. 6 and FIG. 7 are explanatory views showing examples of an ideal process assignment according to the embodiment of the present invention. In FIG. 6, CPU consumption of the servers 101b to 101n is represented by an X-coordinate and a memory consumption is represented by a Y-coordinate. This graph shows a trend in the consumption of the resources used by the process executed by the servers 101b to 101n.

The characteristics of the graph shown in FIG. 6 will be described below assuming that the server 101b has these characteristics. In this graph, an amount that corresponds to 100% that is the maximum amount of a CPU consumption is indicated by a numerical value, "20". This is the numerical value representing the ratio to the consumption of CPUs retained by the server 101c in FIG. 7 described later (assuming that the consumption of the CPUs of the server 101c is "10"), and shows that the server 101b has a performance capable of consuming twice as large amount of CPU as that of the server 101c.

An amount corresponding to 100% that is the maximum value of a memory consumption is indicated by a numerical value, "10". Similarly to the case of CPUs, this is the numerical value representing the ratio to the consumption of memories retained by the server 101c in FIG. 7 described later (assuming that the consumption of the memory in FIG. 7 is "20"), and shows that the server 101b has a performance capable of consuming a quarter of the memories of the server 101c.

A process 601 shown in the graph of FIG. 6 represents a CPU consumption and a memory consumption of the process executed on the server 101b. The consumptions of CPUs and memories occupied by the execution of this process 601 are respectively "10" for CPUs and "5" for memories and occupy respectively a half of the resources retained by the server 101b.

A state where the first process 601 has been executed is represented as a rectangle formed by the origin, the position of "10" of the CPU consumption, and the position of "5" of the memory consumption. The maximum values of CPUs and memories to be consumed is respectively represented as coordinates 602 (hereinafter, coordinates consisting of the maximum values of CPUs and memories to be consumed by one process will be referred to as "consumed resource coordinates"). When a second process 601 is executed, this second process can be represented in a step-like form with the coordinates 602 of the first process 601 as the starting point. Due to this second process 601 having been assigned, the CPU consumption and the memory consumption become respectively the maximum values of the respective resources of the server 101b, and the coordinates indicating these maximum values is represented as coordinates 603.

As described above, when two processes 601 are executed, the CPU consumption and the memory consumption in the server 101b both become the maximum values, and no remaining resources to be assigned to with another process are left for both of the CPU and memory. Therefore, a state where the resources are ideally consumed is realized.

In FIG. 7, the CPU consumption of the servers 101b to 101n is represented as the X-coordinate and the memory consumption of the servers are represented as the Y-coordinate. This graph shows the trend of the consumptions of the resources used by processes executed by the servers 101b to 101n.

The characteristics of the graph shown in FIG. 7 will be described below assuming that the server 101c has the characteristics. In this graph, an amount that corresponds to 100% that is the maximum amount of the CPU consumption is indicated by a numerical value, "10". This represents a half of the consumable amount of the CPU retained by the server 101b of FIG. 6 described above, and represents that the server 101c retains a function that can consume a half of the CPU consumption of the server 101b.

An amount corresponding to 100% that is the maximum value of the memory consumption is indicated by a numerical value, "20". Similarly to the case of the CPU, this represents an amount twice as large the consumable amount of the memory retained by the server 101b of FIG. 6 described above, and represents that the server 101c retains a function that can consume twice as large as the memory consumption of the server 101b.

A process 701 shown in the graph of FIG. 7 represents a CPU consumption and a memory consumption for the process executed on the server 101c. Each of the consumptions of the CPU and the memory occupied by the execution of this process 701 is "5" for the CPU and "10" for the memory, and those consumptions respectively occupy a half of the resources retained by the server 101c.

A state where a first process 701 has been executed is represented as a rectangle formed by the origin, the position of "5" of a CPU consumption, and the position of "10" of a memory consumption, and the maximum values of the CPU and the memory to be consumed can be respectively represented as coordinates 702. When a second process 701 is executed, this process can be represented in a step-like form with the coordinates 702 of the first process 701 as the starting point. Due to this second process 701 having been assigned, the CPU consumption and the memory consumption become respectively the maximum values of the respective resources of the server 101c, and the coordinates indicating these maximum values is represented as coordinates 703.

As described above, when two processes 701 are executed, the CPU consumption and the memory consumption in the server 101c both become the maximum values, and no remaining resources to be assigned to another process are left for both of the CPU and the memory. Therefore, a state where the resources are ideally consumed is realized.

Figure 8:
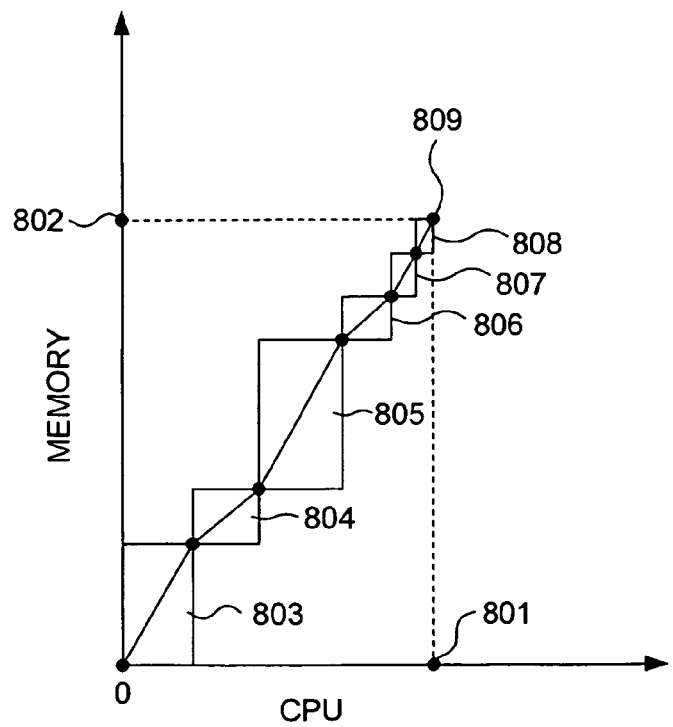
FIG. 8 is an explanatory view showing an example of an optimal resource consumption in the server of the server/client system according to the embodiment of the present invention.
Figure 9:
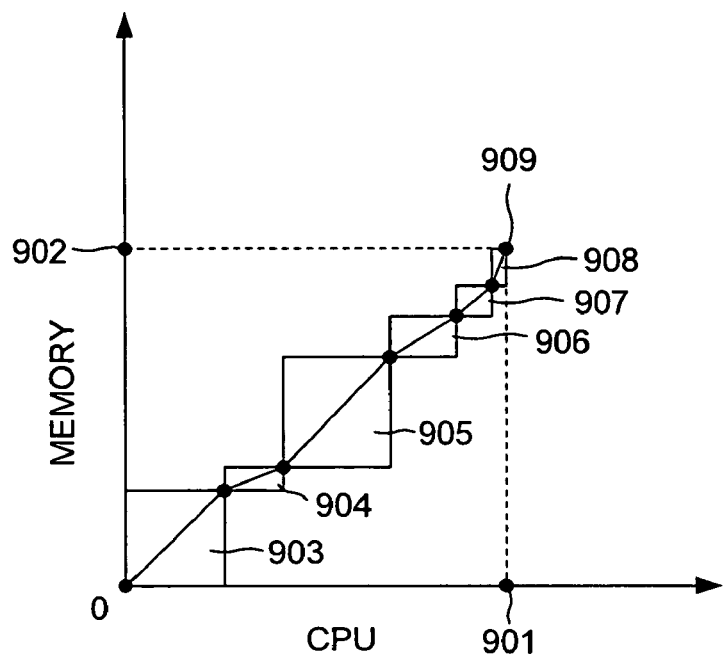
FIG. 9 is an explanatory view showing another example of the optimal resource consumption in the server of the server/client system according to the embodiment of the present invention.
Figure 10:
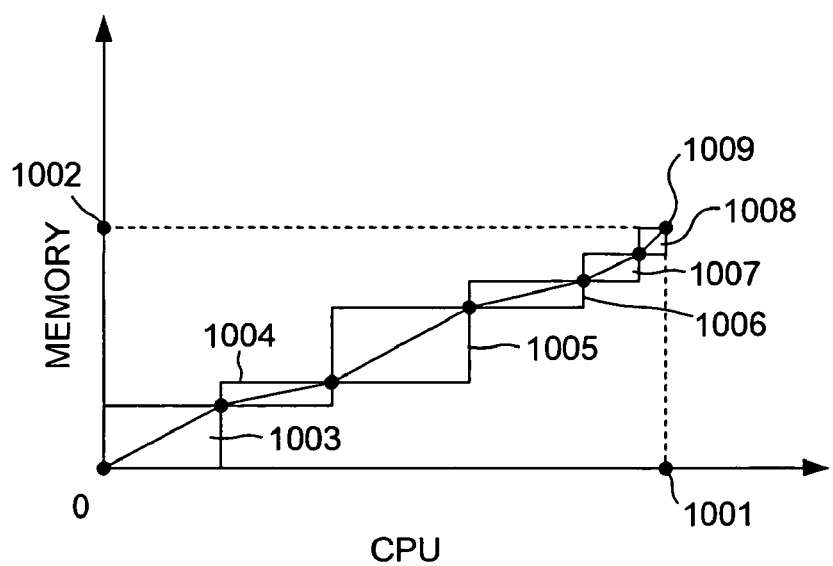
FIG. 10 is an explanatory view showing another example of the optimal resource consumption in the server of the server/client system according to the embodiment of the present invention.

The optimal resource consumption in the servers according to the embodiment of the present invention will be described. FIG. 8 to FIG. 10 are explanatory views showing an example of the optimal resource consumption in the servers of the server/client system according to the embodiment. In FIG. 8, the consumption of the CPU is represented by the X-coordinate and the consumption of the memory is represented by the Y-coordinate. In FIG. 8, and FIG. 9 and FIG. 10 described later, it is represented that, when the servers 101d to 101f exist, amounts of resources that can be consumed respectively by the servers differ from each other.

The characteristics of the graph of FIG. 8 will be described below assuming that the server 101d has these characteristics. In this graph, an amount that corresponds to 100% that is the maximum amount of the CPU consumption is represented by a maximum value 801. This represents 80% of the maximum value of the CPU consumption of FIG. 9 described later, and represents 50% of the maximum value of the CPU consumption of FIG. 10. An amount that corresponds to 100% that is the maximum amount of a memory consumption is represented by a maximum value 802. This represents the same amount as the maximum value of a memory consumption of FIG. 9 described later, and represents 200% that is twice as large as the maximum value of the memory consumption of FIG. 10.

As shown in FIG. 8, a process 803 started first is depicted from the position of the origin; processes started following the process 803 are depicted in a step-like form in the time sequence from processes 804 to 808; and, finally, coordinates 809 that is the intersection of the maximum value 801 of the CPU consumption and the maximum value 802 of the memory consumption is reached. Thus, the server 101d is in a state where the CPUs and the memories thereof are ideally consumed.

In FIG. 9, the CPU consumption is represented by the X-coordinate and the memory consumption is represented by the Y-coordinate in the graph therein. In FIG. 9, similarly to FIG. 8, it is represented that, when the servers 101d to 101f exist, amounts of resources that can be consumed respectively by the servers differ from each other.

The characteristics of the graph shown in FIG. 9 will be described below assuming that the server 101e has these characteristics. In this graph, an amount that corresponds to 100% that is the maximum amount of the CPU consumption is represented by a maximum value 901. This represents 125% of the maximum value of the CPU consumption of FIG. 8 described above, and represents 62.5% of the maximum value of the CPU consumption of FIG. 10 described later.

An amount that corresponds to 100% that is the maximum amount of the memory consumption is represented by a maximum value 902. This represents the same amount as the maximum value of the memory consumption of FIG. 8 described above, and is twice as large as the maximum value of the memory consumption of FIG. 10 described later.

As shown in FIG. 9, a process 903 started first is depicted from the position of the origin; processes started following the process 903 are depicted in a step-like form in the time sequence from processes 904 to 908; and, finally, coordinates 909 that is the intersection of the maximum value 901 of the CPU consumption and the maximum value 902 of the memory consumption is reached. Thus, the server 101e is in a state where the CPU and the memory thereof are ideally consumed.

In FIG. 10, the CPU consumption is represented by the X-coordinate and the memory consumption is represented by the Y-coordinate. In FIG. 10, similarly to FIG. 8 and FIG. 9, it is represented that, when the servers 101d to 101f exist, amounts of resources that can be consumed respectively by the servers differ from each other.

The characteristics of the graph shown in FIG. 10 will be described below assuming that the server 101f has the characteristics. In this graph, an amount that corresponds to 100% that is the maximum amount of the CPU consumption is represented by a maximum value 1001. This represents 200% of the maximum value of the CPU consumption of FIG. 8 described above, and represents 160% of the maximum value of the CPU consumption of FIG. 9. An amount that corresponds to 100% that is the maximum amount of the memory consumption is represented by a maximum value 1002. This maximum value 1002 is 50% of the maximum value of the memory consumption of FIG. 8 and FIG. 9 described above.

As shown in FIG. 10, a process 1003 started first is depicted from the position of the origin; processes started following the process 1003 are depicted in a step-like form in the time sequence from processes 1004 to 1008; and, finally, coordinates 1009 that is the intersection of the maximum value 1001 of the CPU consumption and the maximum value 1002 of the memory consumption is reached. Thus, the server 101f is in a state where the CPU and the memory thereof are ideally consumed.

Figure 11:
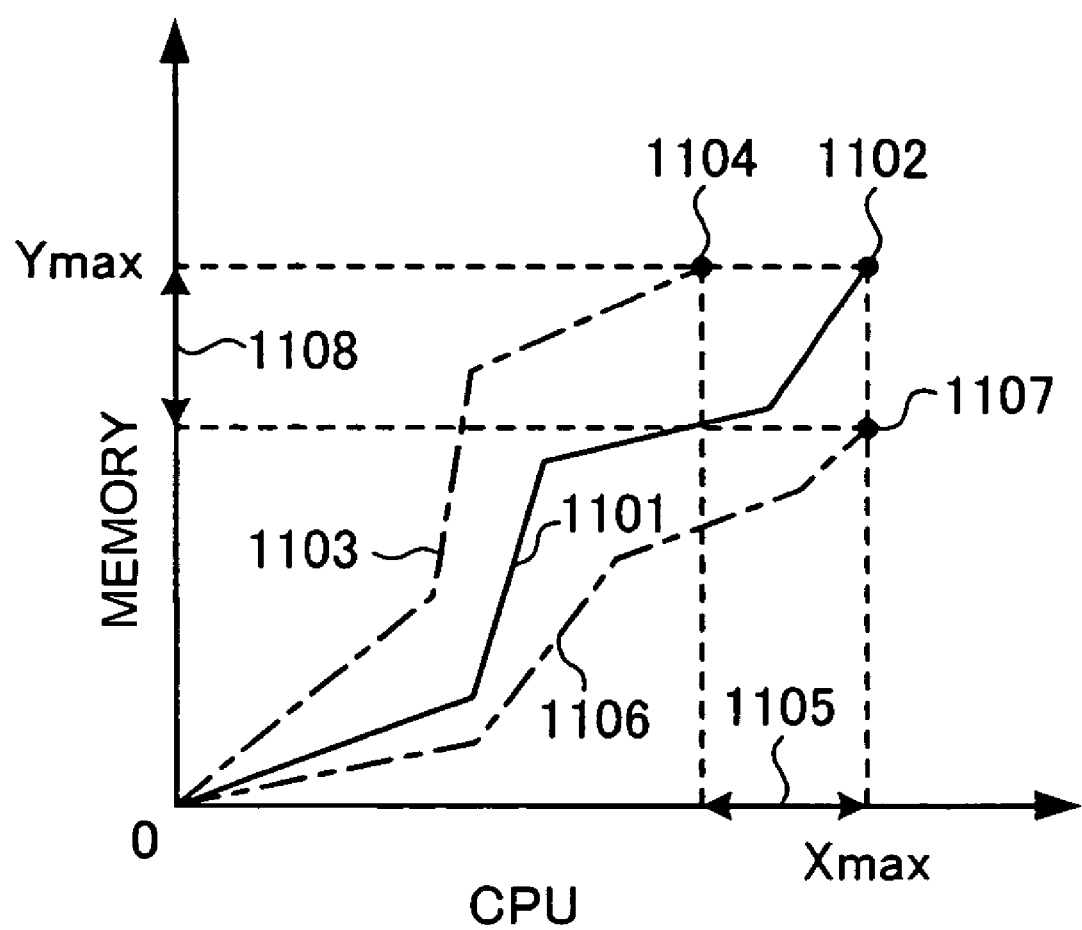
FIG. 11 is an explanatory view showing an example of a resource consumption according to the embodiment of the present invention.

An example of resource consumptions in the servers according to the embodiment of the present invention will be described. FIG. 11 is an explanatory view showing an example of resource consumption of the servers according to the embodiment of the present invention. In FIG. 11, Xmax on the X-coordinate indicates 100% that is the maximum value of the CPU consumption, and Ymax on the Y-coordinate indicates 100% that is the maximum value of the memory consumption.

A line 1101 is an example where the CPU resource and the memory resource are assigned to each process at each occurrence of the process, and coordinates 1102 that are an intersection of the Xmax that is the maximum value of the CPU consumption and the Ymax that is the maximum value of the memory consumption is finally reached. Thus, it is shown that the line 1101 is a graph of the case where the process is distributed without any waste of the CPU consumption and the memory consumption, and the result obtained by ideally consuming the resources is represented.

A line 1103 is an example where, as a result of assigning the CPU resource and the memory resource to each process at each occurrence, the memory consumption has reached the maximum value Ymax thereof before the CPU consumption reaches the maximum value Xmax thereof. This shows that the line 1103 is a graph of the case where the CPU consumption is partially wasted in contrast with the memory consumption, and shows that the CPU are has usable area remained by the amount indicated by a section 1105.

A line 1106 shows an example where, as a result of assigning the CPU resource and the memory resource each process at each occurrence, the CPU consumption has reached the maximum value Xmax thereof before the memory consumption reaches the maximum value Ymax thereof. This shows that the broken line 1106 is a graph of the case where the memory consumption is partially wasted in contrast with the CPU consumption, and shows that the memory has a usable area remained by the amount indicated by a section 1108.

According to the method of assigning the process by the conventional load distribution device, the load is distributed without judging the resource consumptions of the servers, and therefore, it is normal that the states where the resources are not consumed evenly as indicated by the lines 1103 and 1106 are obtained. In contrast, when the process is assigned such that the resources that are the CPU and the memory are consumed evenly, it is possible to avoid the wasteful resources remaining not consumed, as indicated by the line 1101.

(Method of Evaluating Servers)

Figure 12:
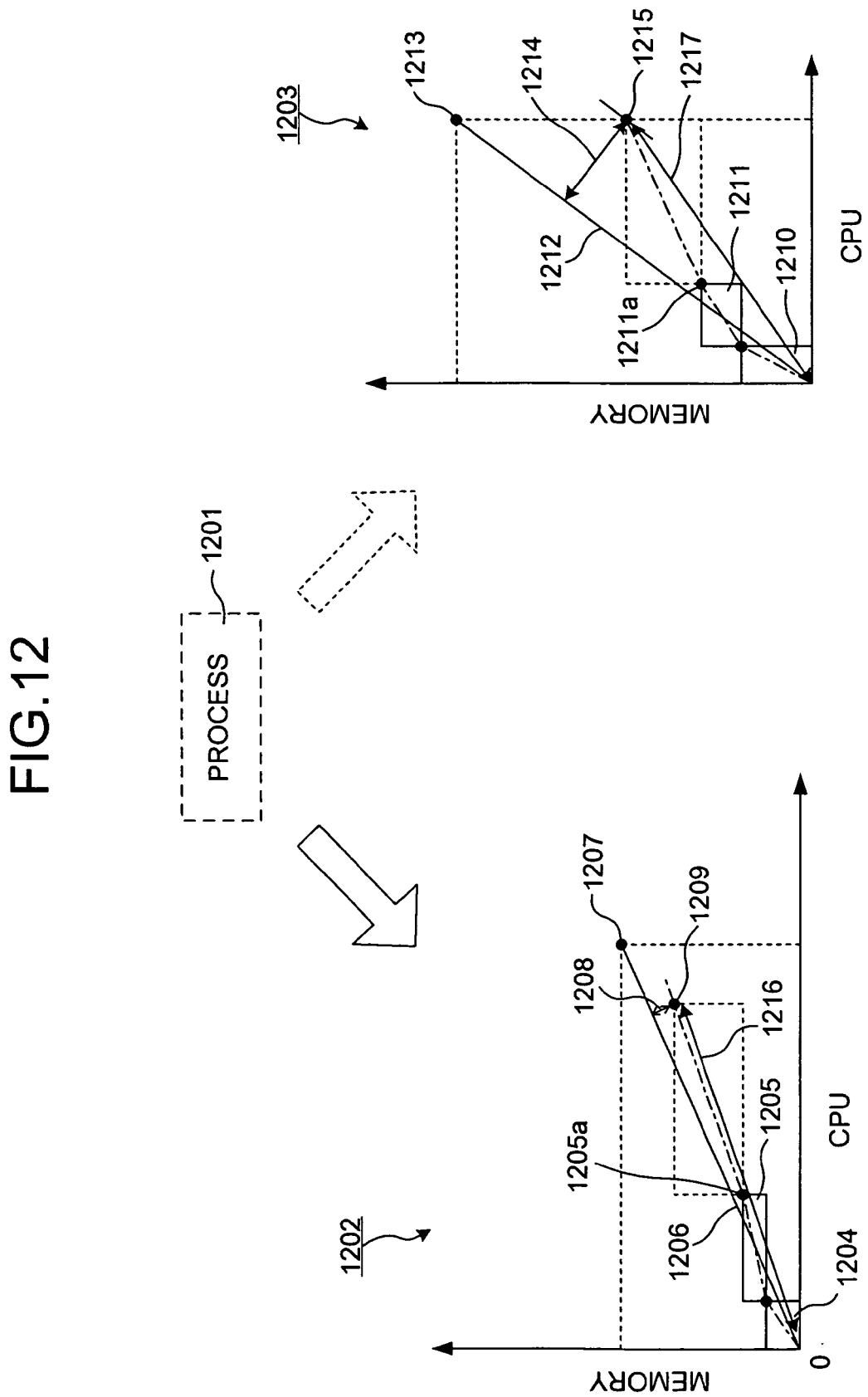
FIG. 12 is an explanatory view showing an outline of a method of evaluating the servers by the load distribution device according to the embodiment of the present invention.

A method of evaluating servers executed by the load distribution device according to the embodiment of the invention will be described. FIG. 12 is an explanatory view showing an outline of a method of evaluating the servers executed by the load distribution device according to the embodiment of the invention. In FIG. 12, the CPU consumption is represented by the X-coordinate and the memory consumption is represented by the Y-coordinate in graphs 1202 and 1203. The graph 1202 shows the contents of the resource consumption of the server 101b and the graph 1203 shows the contents of the resource consumption of the server 101c.

Compared to the graph 1203, the graph 1202 shows a characteristic of a server retaining resources for which the maximum value of the CPU consumption is twice as large as that of and the maximum value of the memory consumption is a half as large as that shown in the graph 1203. In the case of the graph 1202, processes 1204 and 1205 are already assigned and executed. On the other hand, compared to the graph 1202, the graph 1203 shows a characteristic of a server retaining resources for which the maximum value of the CPU consumption is half as large as that of and the maximum value of the memory consumption is twice as large as that of the graph 1203. In the case of the graph 1203, processes 1210 and 1211 are already assigned and executed. A method of determining which of the servers respectively having the characteristic of the graphs 1202 and 1203, should be distributed with the load of the process 1201 to optimally consume the resources when a request for execution of the process 1201 is sent will be described below.

When the process 1201 is executed based on the characteristic of the graph 1203, because an amount of the resource consumption to be caused by the process 1201 is added, coordinates representing the total consumed resource amount (consumed resource coordinates) is changed from a summit 1211a of the process 1211 to coordinates 1215. A straight line formed by connecting coordinates 1213 that is the intersection of the maximum values of the CPU consumption and the memory consumption, and the origin is defined as a "resource consumption optimal line" 1212 (hereinafter, a straight line formed by connecting coordinates that is the intersection of the maximum values of the CPU consumption and the memory consumption, and the origin is referred to as "resource consumption optimal line"), and a normal 1214 is drawn from the coordinates 1215 to this resource consumption optimal line 1212.

On the other hand, when the process 1201 is executed based the characteristic of the graph 1202, because an amount of the resource consumption to be caused by the process 1201 is added, coordinates representing the total consumed resource consumption amount (consumed resource coordinates) is changed from a summit 1205*a* of the process 1205 to coordinates 1209. A straight line formed by connecting coordinates 1207 that is the intersection of the maximum values of the CPU consumption and the memory consumption, and the origin is defined as a resource consumption optimal line 1206, and a normal 1208 is drawn from the coordinates 1209 to this resource consumption optimal line 1206.

By comparing the lengths of the normal 1208 with the normal 1214, it is shown that the length of the normal 1208 is shorter. This indicates that the balance between the consumptions of the memory and the CPU that are the resources of the server 101*b* is closer to being even when the process 1201 is executed by the server 101*b* than when the process 1201 is executed by the server 101*c*. Therefore, as the server to execute the process 1201, the server 101*c* retaining the characteristic of the graph 1203 is not selected and the server 101*b* retaining the characteristic of the graph 1202 is selected. The resources are optimally consumed when the process 1201 is executed by the server For the above, the case can exist where the lengths of the normals 1208 and 1214 are equal and it can be judged that the resources can be appropriately consumed equally when either of the servers has been selected. In this case, distances 1216 and 1217 between consumed resource coordinates 1209 and 1215 respectively, and the origin are compared, and the server relating to the shorter of the distances is assigned. By doing this, a server having a smaller resource consumption can be assigned when servers respectively having an equal distance to the resource consumption optimal line thereof exist. When both of the resource consumption and the distance from the resource consumption optimal line are desired to be taken into account, this desire can be realized by selecting a server having a smaller value of an area (1208×1216, 1214×1217) obtained by multiplying the length of the normal (1208, 1214) by the distance to the origin (1216, 1217).

Figure 13:
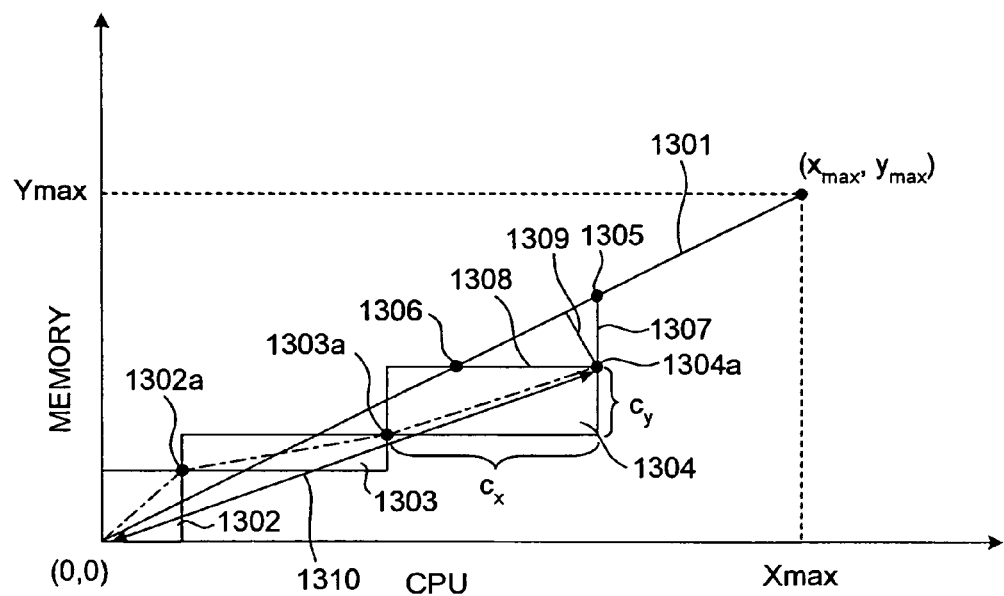
FIG. 13 is an explanatory view showing an example of a function for a method of evaluating a server to be assigned according to the embodiment of the present invention.

A function for the method of evaluating the server to be assigned according to the embodiment of the present invention will be explained next. FIG. 13 is an explanatory view showing an example of a function for the method of evaluating the server to be assigned according to the embodiment of the present invention. In FIG. 13, Xmax on the X-coordinate shown represents 100% that is the maximum value of a CPU consumption and Ymax on the Y-coordinate represents 100% that is the maximum value of a memory consumption. In a space having parameters of resources as the axes thereof, coordinates of the intersection of the origin and the maximum available capacities of the parameters, that is, Xmax and Ymax are defined as ($X_{max}$, $Y_{max}$), and a straight line formed by connecting ($X_{max}$, $Y_{max}$) and the origin (0, 0) is defined as a resource consumption optimal line 1301. The characteristics of the graph shown in FIG. 13 will be described below assuming that the server 101*b* has these characteristics.

A process 1302 being executed first is shown as a rectangle starting from the origin and having the memory consumption and the CPU consumption consumed by the process 1302 respectively as the length of the longitudinal and the lateral sides thereof. This is a rectangle showing the resources consumed by each process. A summit diagonal from the origin of the rectangle shown by this process is represented as coordinates 1302*a*.

A process 1303 being executed secondly is shown as a rectangle having the coordinates 1302*a* as the starting point thereof and the memory consumption and the CPU consumption consumed by the process 1303 respectively as the length of the longitudinal and the lateral sides thereof. A summit diagonal from the coordinates 1302*a* that is the starting point of this rectangle is represented as coordinates 1303*a*.

When a third process that is newly assigned is a process 1304, the process 1304 is shown as in FIG. 13 as a rectangle having the coordinate 1303*a* as the starting point thereof, the CPU consumption as "$c_x$", and the memory consumption as "$c_y$". A diagonal summit of the coordinate 1303*a* that is the starting point of the rectangle is represented as coordinates 1304*a*.

The length of a normal 1309 drawn from the coordinates 1304*a* to the resource consumption optimal line 1301 will be obtained. Values of the positions of x and y shown in the graph of FIG. 13 are expressed in Equation (1) and Equation (2) below.

$$y = f_{xy}(x) = (y_{max}/x_{max}) \times x \quad (1)$$

$$x = f_{yx}(y) = (x_{max}/y_{max}) \times y \quad (2)$$

As described above, consumed resource coordinates consumed by the first process 1302 and the second process 1303 is represented as the coordinates 1303*a*. Consumed resource coordinates consumed by the third process is represented as coordinates 1304*a*. The coordinates of the coordinates 1304*a* is represented as ($x_1$, $y_1$)=($x_0+c_x$, $y_0+c_y$).

On the other hand, the intersection of a straight line parallel to the longitudinal axis and crossing the coordinates 1304*a*, and the resource consumption optimal line 1301 is represented as coordinates 1305. The intersection of a straight line parallel to the lateral axis and crossing the coordinates 1304*a*, and the resource consumption optimal line 1301 is represented as coordinates 1306. A straight line connecting the coordinates 1304*a* and the coordinates 1305 is represented as a straight line 1307 and the length of the straight line 1307 is given by Equation (3) below.

$$\Delta y = |f_{xy}(x_1) - y_1| \quad (3)$$

A straight line connecting the coordinates 1304*a* and the coordinates 1306 is represented as a straight line 1308 and the length of the straight line 1308 is given by Equation (4) below.

$$\Delta x = |f_{yx}(y) - x_1| \quad (4)$$

A normal drawn from the coordinates 1304*a* to the resource consumption optimal line 1301 is represented as a normal 1309 and the length of the normal 1309 is given by Equation (5) below.

$$dis_{xy} = \Delta x \Delta y / \sqrt{(\Delta x^2 + \Delta y^2)} \quad (5)$$

This $dis_{xy}$ is the distance from the resource consumption optimal line 1301 to the coordinates 1304*a* and is the value to be evaluated when the load distribution device 101*a* determines servers to be caused to execute a process from a plurality of servers.

An equation to obtain the distance from consumed resource coordinates to the resource consumption optimal line for the case of an n-th function including other parameters in addition to the CPUs and the memories described above, will be descried. A resource consumption optimal line that has n parameters ($x_i$) (where $1 \leq i \leq n$) that are used as resources and can be obtained in an n-th Euclidean space, is expressed by Equation (6) below using the case for two dimensions.

$$x_{i+1} = f_{xix(i+1) \bmod n}(x_i) = (x(i+1)_{\bmod n \max} / x_i \max) \times x_i \quad (6)$$

Assuming that the resource consumptions of the existing servers are ($x_{i0}$) (where $1 \leq i \leq n$) and the resource consumptions of a process is ($c_i$) (where $1 \leq i \leq n$), $$x_{i1} = x_{i0} + C_i \quad (7)$$

In this case, Equation (8) is, $$\Delta x(i+1)_{mod\,n} = |f_{xi\,x(i+1)mod\,n}(x_{i1}) - x(i+1)_{mod\,n\,1}| \quad (8)$$

and the distance between a point ($x_{i1}$) (where $1 \leq i \leq n$) in the n-th Euclidean space and the resource consumption optical line 1301 can be expressed as in Equation (9) below.

$$dis = \prod_{i=1}^{n}(\Delta x_{(i+1)modn}) \Big/ \sqrt{\left(\sum_{i=1}^{n}(\Delta x_{i+1)modn})^2\right)} \quad (9)$$

Therefore, the load distribution device 101a calculates the distance (dis) expressed by Equation (5) or Equation (9) for each of the servers 101b to 101n to be distributed to with the loads, and allots processing for the execution of the process to a server having the shortest of the distances.

A distance 1310 between a point ($x_{ij}$) (where $1 \leq i \leq n$) in the n-th Euclidean space and the origin can be expressed as in Equation (10).

$$diag = \sqrt{\left(\sum_{i=1}^{n}x_{i1}^2\right)} \quad (10)$$

Therefore, when one server is selected from the servers having the equal length dis of the normals thereof, a server having the smallest value of diag is selected and the processing for execution of the process is assigned to this server. When the length dis of the normal and the distance diag to the origin are desired to be evaluated simultaneously, the processing is assigned to the server having the smallest value of dis×diag.

The resources other than the CPUs and memories described above are, for example, GPUs, video memories, network interface cards, etc. A GPU is a graphic chip for executing, by hardware, rendering and geometry processing in games that use 3-D graphics. A video memory is a memory that is used by a GPU when the GPU executes processing of an image process, and is contained in the GPU. A network interface card is, for example, an Ether adaptor that terminates 100 Base, 1000 Base-TX, etc.

Figure 14:
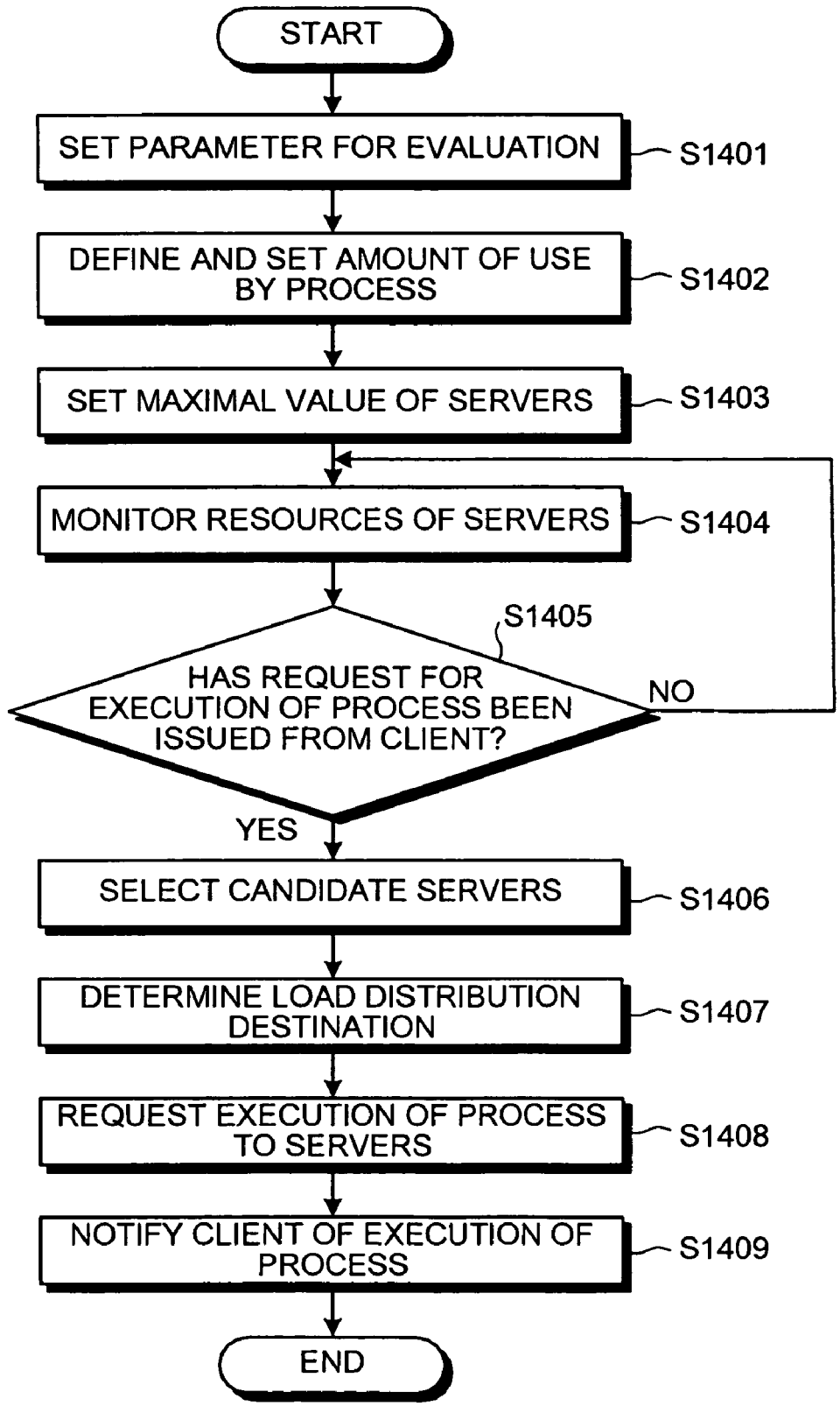
FIG. 14 is a flowchart showing an example of a procedure of evaluating and determining a server by the load distribution device according to the embodiment of the present invention.

The details of the processing for evaluating and determining a server by the load distribution device according to the embodiment of the present invention will be described. FIG. 14 is a flowchart showing an example of a procedure of evaluating and determining a server by the load distribution device according to the embodiment of the present invention. In the flowchart shown in FIG. 14, parameters used when the load distribution device 101a evaluates the servers 101b to 101n are set (step S1401). The parameters are, for example, a CPU consumption, a memory consumption, a GPU consumption, a video memory consumption included in a GPU, a band consumption of a network interface card, etc.

Amounts of used resources used respectively by a plurality of processes when the processes are executed are defined and set for each parameter (step S1402). For each of the servers 101b to 101n, the maximum values of the resources that are the parameters defined at step S1402 are set (step S1403).

Resource consumptions of the parameters set at step S1401 are obtained and monitored for each of the servers 101b to 101n (step S1404). Whether a request for execution of a process has been sent from the terminal device 102 that is the client or the mobile phone 103 is judged (step S1405). When no request for execution of the process has been sent (step S1405: NO), the procedure is returned to step S1404, and the step of monitoring the resource consumptions consumed, for each of the servers 101b to 101n (step S1404) is continued.

On the other hand, when a request for execution of a process has been sent from the terminal device 102 that is the client (step S1405: YES), candidate servers to execute this process are selected from the servers 101b to 101n (step S1406). This selection is conducted such that servers having used amounts that do not exceed the maximum value for any one of the parameters that have been set at step S1401 are selected from the servers 101b to 101n. Evaluation is further conducted by obtaining the distance of the normal 1309 drawn from the consumption resource coordinates 1304 to the resource consumption optimal line 1301 of FIG. 13 described above, for the candidates selected at step S1406, and the server having the shortest distance, for example, the server 110b is determined as the load distribution destination (step S1407).

In the selection of candidate servers at S1406, as described above, the distance 1310 between the consumption resource coordinates 1304 and the origin can be evaluated simultaneously in addition to the length of the normal 1309 drawn from the consumption resource coordinates 1304a to the resource consumption optimal line 1301. When servers respectively having the normal of the equal length exist, the server having the smallest resource consumption can be selected by selecting the server having the shortest distance 1310 to the origin. Otherwise, by selecting the server having the smallest value obtained by multiplying the length of the normal 1309 by the distance 1310 to the origin, the optimal resource consumption can be realized and the process can be assigned to the server having the smallest resource consumption.

The load distribution device 101a requests execution of the process to the server 101b that is the load distribution destination determined at step S1407 (step S1408), and notifies the terminal device 102 of the IP address, service port number, etc., that are collectively information necessary for accessing the server 110b that is the load distribution destination to show the terminal device 102 that is the client that the process has been executed (step S1409). The terminal device 102 that has been notified of the information necessary for accessing the server 101b, can access directly the server 101b and the processing ends.

Figures 15, 16:
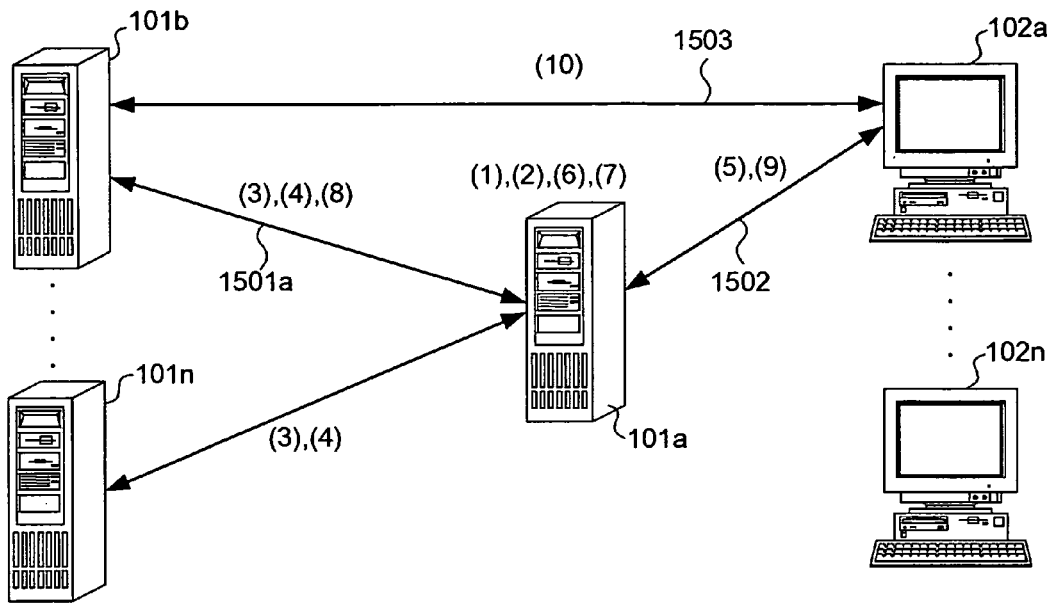
FIG. 15 is a schematic showing another example of the procedure of evaluating and determining the server by the load distribution device according to the embodiment of the present invention.
FIG. 16 is an explanatory view showing an example of a table retaining information on a process according to the embodiment of the present invention.

The details of the procedure for evaluating and determining a server by the load distribution device according to the embodiment of the present invention will be described. FIG. 15 is a schematic showing an example of a procedure of evaluating and determining a server by the load distribution device according to the embodiment of the present invention. In FIG. 15, it is shown that the load distribution device 101a distributes the load of the execution of a process requested by the terminal device 102a to 102n to the servers 101b to 101n. In FIG. 15, the load distribution device 101a executes the processing, following the procedure below.

(1) Parameters used for evaluation conducted when the load is distributed are set.

(2) A used amount for each parameter consumed by the process executed in each server is defined and set. This setting is made every time a new process is added. For example, in the case where four parameters such as the CPU, the memory, the GPU, and the video memory are used, when the process to be executed is a 3-D game, resources are consumed for the GPU and the video memory in addition to the CPUs and the memories. When the process to be executed is a 2-D game, the GPU and the video memory are not consumed. In this manner, the resources to be consumed differ according to the contents of the process.

(3) The maximum value of each parameter retained respectively by the servers is set. This setting may be made manually to the load distribution device 101a by an administrator, etc., or the servers may respectively be monitored one after another through the network 100 and be caused to obtain the values that have been set. Because various servers 101b to 101n are likely to be disposed according to the purpose of use thereof, the maximum capacity may be set for each of the parameters. This step is indicated by an arrow 1501a.

(4) For the resources set as the parameters, amounts consumed are monitored for each of the servers 101b to 101n. This step is indicated by the arrow 1501a and the servers 101b to 101n are monitored one after another from the load distribution device 101a and the consumptions are obtained.

(5) A request for executing a process is accepted from the terminal device 102a that is the client. Simultaneously, the amount of each resource to be used by the accepted process is obtained. This step is indicated by an arrow 1502.

(6) The load distribution device 101a selects candidate servers to execute the process from the servers 101b to 101n. Whether the consumption of the resources to be used by the process for which the request for execution has been accepted, do not exceed the maximum values of the resources of each server is checked and the servers having the maximum values that are not exceeded are selected as the candidates.

(7) The load distribution device 101a further evaluates the candidates selected at (6) by obtaining each distance of the normal 1309 drawn from the consumption resource coordinates 1304a to the resource consumption optimal line 1301 or each distance 1310 between the consumption resource coordinates 1304a and the origin shown in FIG. 13 described above; and, from those candidates, determines the server having the normal thereof having the shortest length or, when the lengths of the normals are equal, the server having the shortest distance 1310 thereof from the origin or the server having the smallest value thereof obtained by multiplying the length of the normal by the distance from the origin, for example, the server 101b as the load distribution destination.

(8) The load distribution device 101a requests execution of the process to the server 101b that is the load distribution destination determined at step S1407. At this time, when the server 101b accepts only accesses for the request for the execution from clients that have been authenticated, IDs, IP addresses, service port numbers, keys for encryption, tokens, etc., are also transmitted from the terminal device 102a to the server 101b. This step is indicated by the arrow 1501a.

(9) Information on the server 101b that is the load distribution destination is notified to show the terminal device 102a that is the client that the process has been executed. This information is necessary for the terminal device 102a when the terminal device 102a accesses the server 101b. For example, this information refers to the IP address, the service port number, keys and tokens relating to authentication and encryption of the server 101b necessary for the terminal device 102a to access directly the server 101b. This step is indicated by the arrow 1502.

(10) The terminal device 102a that has been notified of the information necessary for accessing the server 101b, can access the server 101b. Based on the information notified of at (9), an access from the terminal device 102a to the server 101b is enabled. On the server 101b side, Whether or not an access is from the client that has been authenticated is verified by checking whether or not the IP address, the ID, the tokens, etc., coincide with those in the notified information. The communication is encrypted when the encrypting keys have been exchanged in advance. This step is indicated by an arrow 1503.

(Contents of Information on Process)

Information on processes retained by the load distribution device according to the embodiment of the invention will be described. FIG. 16 is an explanatory view showing an example of a table retaining the information on the process according to the embodiment of the present invention. As shown in FIG. 16, a process information table 1600 stores the data contents for retaining the information on the processes and consists of columns respectively for IDs to uniquely identify the processes respectively, process names that are names of the processes, a used amount of CPU used when each process is executed, and the used amount of memory used when each process is executed.

The data attribute of the ID is a text type, or an integer type if an ID can be expressed only in digits. The data attribute of the process name is a text type, etc. The data attributes of the CPU consumption and the memory consumption are defined to be an attribute of a floating-point type, etc.

According to the data contents of a process shown by a record having an ID of "100", the process name is Process 1, the CPU amount to be used is 0.15, and the memory amount to be used is 0.2. According to the data contents of a process shown by a record having an ID of "110", the process name is Process 2, the CPU amount to be used is 0.2, and the memory amount to be used is 0.4 and, the CPU amount to be used and the memory amount to be used are same as the case of the process having the ID of "100". This shows that, when the processes having the ID of "100" and "110" are executed respectively, the values of the consumption of the CPU and the memory consumed in a server that executes each of the processes are increased by the values of the used amounts of the CPU and the memory registered respectively in the table.

When the load distribution device 101a has received the request for execution of the process, the load distribution device 101a selects a server to distribute the load to, using the process information in the process information table 1600. When the number of the servers 101b to 101n to distribute to is small, it is sometimes simpler that the information is written into a file for reference by a text file, etc., without any table administration using the database such as the table described above. In such a case, the contents of the table is created as a file for reference as necessary and the format of the file may be determined arbitrarily.

(Information on Table)

Server information retained by the load distribution device according to the embodiment of the present invention will be described. FIG. 17 is an explanatory view showing an example of a table retaining information on the servers of the server/client system according to the embodiment of the present invention. In FIG. 17, a server information table 1700 stores data for retaining the information on the servers and consists of columns respectively for connection destination server names to uniquely identify the servers, the use rate of a CPU being used in each server, and the use rate of a memory being used in each server.

The data attribute of the connection destination server names is a text type, or an integer type if a name can be expressed only in digits. The data attributes of the rate of use of a CPU and the rate of use of a memory are a floating-point type, etc. The rate of use of a CPU or a memory listed in the server information table 1700 is a rate, expressed as a value, of a CPU or a memory already used in each of the servers

101a, 101b, and 101c. The maximum values of the rates of use of a CPU and a memory in the servers 101b, 101c, and 101d are respectively 1.0 (=100%). The load distribution device 101a may monitor regularly these values from each of the servers and set these values into the table, or may obtain these values as necessary when the device 101a distributes the load. Which of the servers 101b, 101c, and 101d the load is distributed to is evaluated as below.

According to a record having the connection destination server name, "101b" listed in the first row of the server information table 1700, the rate of use of a CPU is 0.9 and the rate of use of a memory is 0.88. The rates of use of this server 101b are high for both of a CPU and a memory, and when the amount of use of a CPU and the amount of use of a memory of Process 1 shown in FIG. 16 are added, respectively exceed 1.0 (=100%). Therefore, it is found that no room is left in resources for executing Process 1.

According to a record having the connection destination server name, "101c" listed in the second row, the rate of use of CPUs is 0.5 and the rate of use of memories is 0.2. When the amount of use of a CPU and the amount of use of a memory of Process 1 shown in FIG. 16 are added to those of this server 101c, the rate of use of a CPU is 0.65 and the rate of use of a memory is 0.4. Therefore, both rates are less than 1.0 (=100%) and it can be seen that some room of the resources for executing Process 1 is left.

According to a record having the connection server name, "101d" listed in the third row, the rate of use of a CPU is 0.3 and the rate of use of a memory is 0.2. When the amount of use of a CPU and the amount of use of a memory of Process 1 shown in FIG. 16 are added to those of this server 101d, the rate of use of a CPU is 0.45 and the rate of use of a memory is 0.4. Therefore, both rates are less than 1.0 (=100%) and it is found that some room is left in the resources for executing Process 1.

Using Equation (5), obtaining the distance dis of each normal drawn from the consumption resource coordinates of these servers 101c and 101d to the resource consumption optimal line, the distance for the server 101c is approximately 0.177 and the distance for the server 104c is approximately 0.035. Thereby, the load distribution device 101a selects and assigns the server 101d for which the distance is short, as the optimal server.

As to the distance diag between the consumption resource coordinates and the origin, from Equation (10), this distance is approximately 0.763 for the server 101c and approximately 0.602 for the server 101d. The value of the product of the two values (dis×diag) is approximately 0.135 for the server 101c and approximately 0.021 for the server 101d. Therefore, even when both of the length of the resource consumption optimal line and the distance between the consumption resource coordinates and the origin are taken into account simultaneously, the server 101d is selected and assigned as the optimal server.

When the servers to be distributed to are few such as 101b, 101c, and 101d, it is sometimes simpler that the information is written into a file for reference by a text file, etc., and updated without any table administration using the database as described above. In such a case, the contents of the table shown in FIG. 17 may be written as a text file as necessary and the format of the file may be determined arbitrarily and be created. Thought not shown, not only the rates of use of CPUs and memories but also the items such as IP addresses, port numbers, etc., for accessing each server may be set as necessary.

(Contents of Regional Distribution of Servers)

Figure 18:
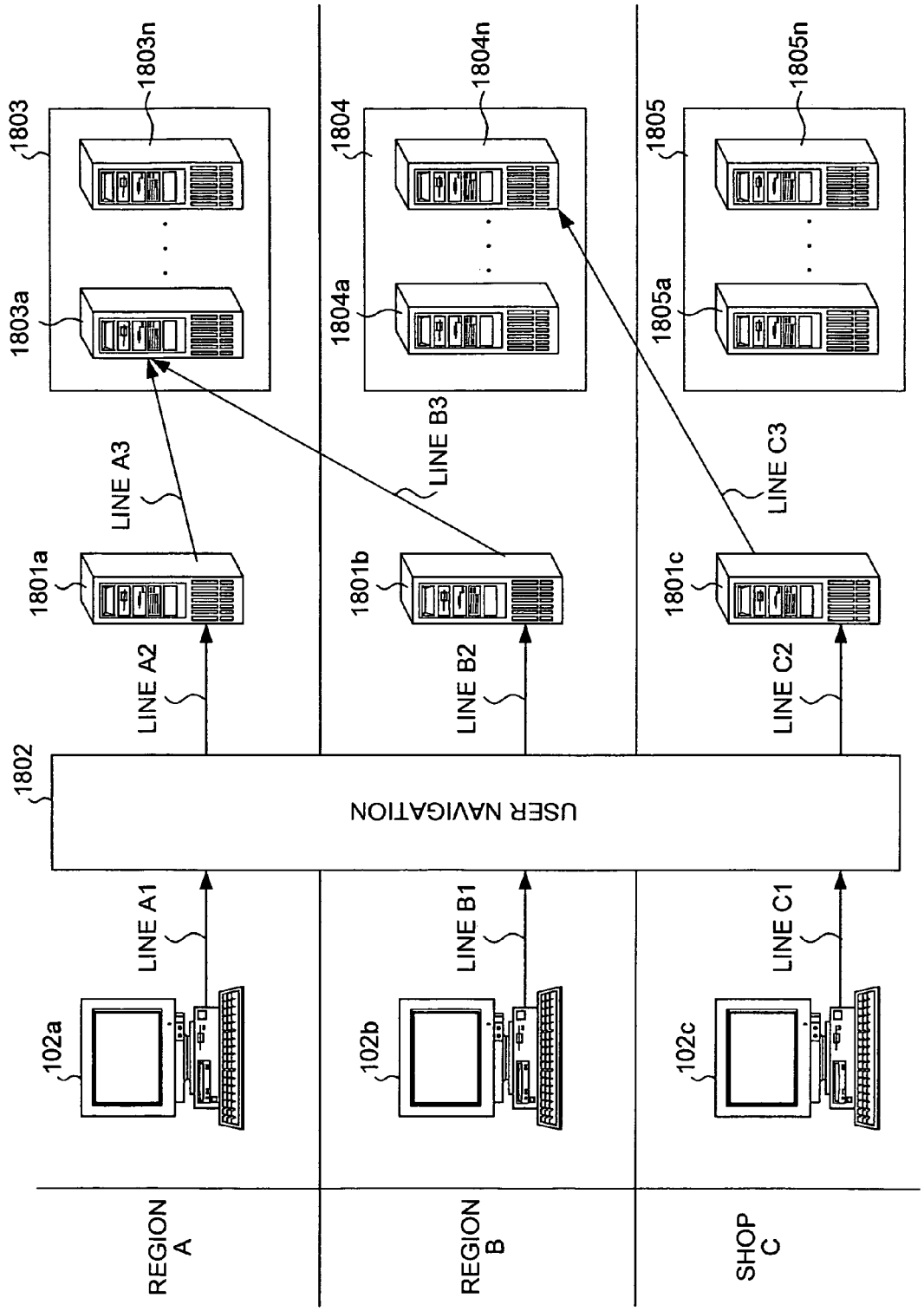
FIG. 18 is an explanatory view showing an example of a regional distribution of the servers of the server/client system according to the present invention.
Figure 19:
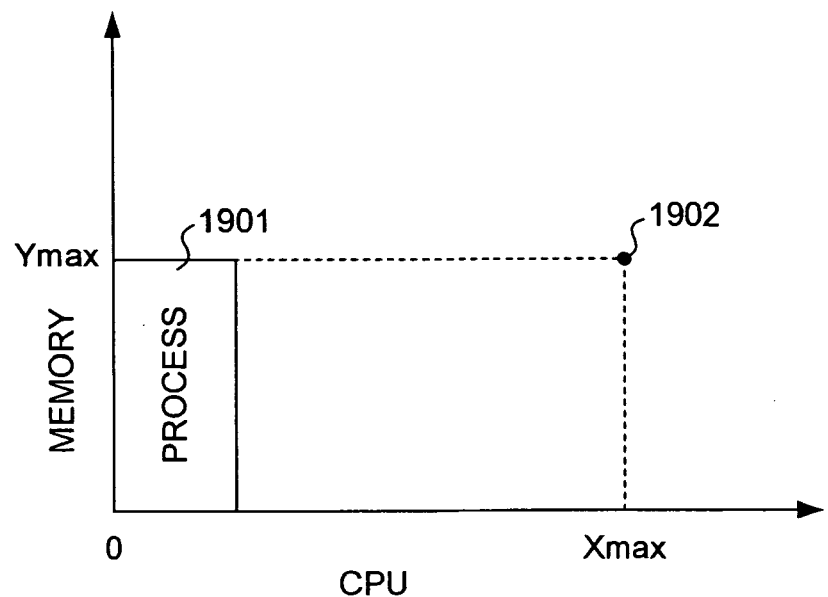
FIG. 19 is an explanatory view showing an example of a relation between an amount of resource retained by a server and an amount of resource consumed by a process.
Figure 20:
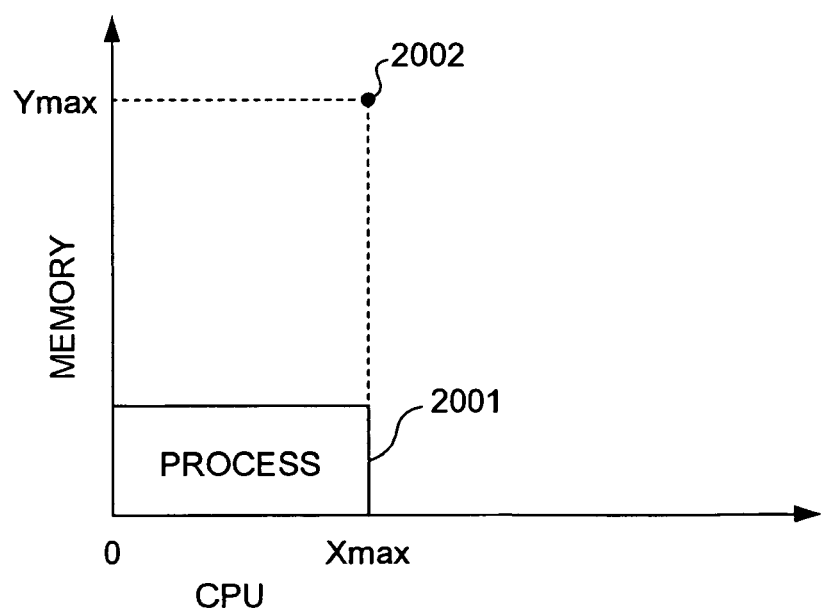
FIG. 20 is an explanatory view showing another example of the relation between an amount of resource retained by a server and an amount of resource consumed by a process.

Load distribution to servers administered regionally according to the embodiment of the present invention will be described. FIG. 18 is an explanatory view showing an example of a regional distribution of the servers of the server/client system according to the present invention. As shown in FIG. 18, a load distribution device 1801a, and servers 1803a to 1803n installed in a center 1803 are disposed in a region A; a terminal device 102b, a load distribution device 1801b, and servers 1804a to 1804n installed in a center 1804 are disposed in a region B; and a terminal device 102c, a load distribution device 1801c, and servers 1805a to 1805n installed in a center 1805 are disposed in a shop C. Thus, an example of a complex server/client system using apparatuses distributed to regions or shops is shown.

A line A1 that indicates the flow of a request for execution of a process from the terminal device 102a disposed in the region A, is transmitted by a user navigation 1802 to the load distribution device 1801a through a line A2. The user navigation 1802 refers to a system that identifies the region from the IP address of a client and executes routing; identifies regions from addresses of local DNS servers and executes routing; etc. Thus, the region of a client can be identified and a server disposed in a region closest (that is, delay of data transmission is small in terms of the network) to the client can be assigned with priority. The request for the execution of the process transmitted to the load distribution device 1801a through the line A2 causes the load distribution device 1801a to distribute the load to and to transmit the request for the execution of the process to the server 1803a disposed in the same region through a line A3.

A line B1 that indicates a request for execution of a process from the terminal device 102b disposed in the region B, is transmitted by the user navigation 1802 to the load distribution device 1801b through a line B2. Normally, the request for the execution of the process is transmitted to any one of the servers 1804a to 1804n disposed in the region B. However, when the load distribution device 1801a and the load distribution device 1801b are arranged to exchange resource monitoring information of server groups administered respectively by the load distribution devices 1801a and 1801b, the load is enabled to be distributed to the server 1803a disposed in another region that is the region A through a line B3. When the load distribution device 1801b is caused to monitor the resources of all of the servers in the regions A and B and the shop C, the servers to be distributed to with the load can be selected from all the servers in addition to the server 1803a disposed in the region A.

A line C1 that indicates a request for execution of a process from the terminal device 102c disposed in the shop C, is transmitted by the user navigation 1802 to the load distribution device 1801c through a line C2. The load distribution device 1801c evaluates servers that can be distributed to with the load from the servers 1805a to 1805n in the shop C. However, when no server that retains resources that can be assigned is present in the same shop C as the terminal device 102c, the load may be distributed and assigned to the server 1804n in the next region B through a line C3.

It is known that, as to accesses to many Internet applications including games, etc., the frequency of the accesses varies according to the time of day. For example, an application is assumed, for which the peak of the accesses thereto is at 10:00 p.m. and the frequency of accesses is reduced by several tens of percents from that of the peak time at times before and after the peak, for example, 9:00 p.m. and 11:00 p.m. Taking into account the time gap between east and west, east-west regional load distribution is enabled, according to which, when the resources of servers in the region that is in the peak time band are depleted, servers disposed in regions respectively having a time gap of one hour earlier and later accept the request for processing the process from clients in the peak time band and process the process as extra resources. Even on the equator, the average one-hour time gap corresponds to a little less than 1700 km and the round-trip time generated by the propagation delay is approximately 17 ms. According to the above, the delay is a delay at a level that can be used successfully even in an applications for which transmission is conducted frequently between a server and a client, such as a game, etc., and the load of applications that have peaks thereof depending on the time of day can be effectively distributed.

When only the resource capacity that is consumed by the process requested to be executed is remained, the servers to be load distribution destinations may be disposed anywhere regardless of region. Thus, by entering contracts to partially rent resources such as hosting servers used as web servers that do not generally significantly consume resources, a plurality of PC servers installed in internet cafes in various places, etc., and to use those computers as servers to be distributed to with the load, redundant load distribution is enabled.

As described above, according to the embodiment, by evaluating using the resource consumption consumed when the process that has been requested to be executed from the terminal device 102 is executed, servers that can execute the process can be selected from the servers 101b to 101n. Every time the process to be executed is newly added or modified, the execution of the process can always be assigned to the optimal server by registering the latest resource consumption. Because the servers are selected using the resource consumption of the process that has been requested to be executed and the remaining amount of the resources retained by the servers 101b to 101n that are always be monitored, mismatching of the resource amount consumed by the process and the remaining amount of the resource of the servers can be prevented.

By evaluating with the function that causes the resources of the servers to be consumed without wasting any thereof using the resource consumption of the process that has been requested to be executed and the remaining amount of the resources retained by the servers 101b to 101n that are always be monitored, the optimal servers that consume the resources without wasting any thereof can be selected, and the servers for executing games and application programs, etc., for which the amount of resources consumed differs by process can be flexibly selected.

From a plurality of servers that respectively retain different amounts of resources, the servers having the remaining amounts of resources corresponding to the resource amount consumed by the process that is desired to be executed can be selected. Thereby, the server resources are ideally consumed, the processes (the number of games, etc.) simultaneously processed by collectively the plurality of servers can be maximized, and the capacity can be fully used without wasting any thereof for each resource parameter of each server.

When the load distribution device 101a of the embodiment is used, distributing the load to servers that can not execute the process due to shortage of remaining amounts of resources, or that are likely to queue the process can be prevented. Therefore, waiting time after the request for execution of a process can be reduced.

The load distribution method described in the embodiment may be realized by executing a program prepared in advance, on a computer such as a personal computer, a work station, etc. This program is recorded in a computer-readable recording medium such as a hard disk, a flexible disk, a CD-ROM, an MO, a DVD, etc., and is executed by being read from the recording medium by the computer. This program may be a transmission medium capable of being distributed through a network such as the Internet, etc.

INDUSTRIAL APPLICABILITY

As described above, the server/client system, the load distribution device, the load distribution method, and the load distribution program are useful for causing the resources in the servers that are load distribution destinations to be consumed being well balanced, and are particularly suitable for assigning processes, such as games, etc. that are requested by many users to be executed, to plural servers.

The invention claimed is:

1. A server/client system in which a plurality of servers and a plurality of clients are connected through a network, and the servers execute a process based on a process request from the clients and transmit a process result to the clients, wherein
at least one of the servers includes
a process information receiving unit configured to receive information on the process from the clients through the network;
a determining unit configured to determine a server to execute the process from among the servers based on the information on the process; and
a server information transmitting unit configured to transmit information on the determined server to the clients, and
each of the clients includes
a server information receiving unit configured to receive the information on the determined server; and
a process request transmitting unit configured to transmit the process request to the determined server,
wherein the determining unit includes
a first calculating unit configured to calculate, for each of the servers, a first distance from an estimation point indicating an estimated consumption to an ideal consumption line, the first distance being a normal that connects the estimation point and the ideal consumption line, the estimated consumption obtained by adding an amount of resource to be consumed by execution of the process to a point indicating a current resource consumption for each of the servers, the ideal consumption line being a straight line that connects an origin point and a point indicating a maximum resource capacity for each of the servers expressed in a space having parameters of resource as axes; and
a second distance calculating unit configured to calculate, for each of the servers, a second distance from the estimation point to the origin point in the space, and
the determining unit is configured to determine the server based on at least one of the first distance and the second distance.

2. The server/client system according to claim 1, wherein the parameters include at least one of a load amount of a central processing unit, a load amount of a system memory, a load amount of a graphic processing unit, a load amount of a video memory, and a load amount of a network interface card.

3. A load distribution device used in a server/client system in which a plurality of servers and a plurality of clients are connected through a network, and the servers execute a process based on a process request from the clients and transmit a process result to the clients, comprising:
a processor;
a process information receiving unit configured to receive information on the process from the clients through the network, a determining unit configured to determine a server to execute the process from among the servers based on the information on the process; and a server information transmitting unit configured to transmit information on the determined server to the clients, wherein the determining unit includes a first calculating unit configured to calculate, for each of the servers, a first distance from an estimation point indicating an estimated consumption to an ideal consumption line, the first distance being a normal that connects the estimation point and the ideal comsumption line, the estimated consumption obtained by adding an amount of resource to be consumed by execution of the process to a point indicating a current resource consumption for each of the servers, the ideal consumption line being a straight line that connects an origin point and a point indicating a maximum resource capacity for each of the servers expressed in a space having parameters of resource as axes; and a second distance calculating unit configured to calculate, for each of the servers, a second distance from the estimation point to the origin point in the space, and the determining unit is configured to determine the server based on at least one of the first distance and the second distance.

4. The load distribution device according to claim 3, the parameters include at least one of a load amount of a central processing unit, a load amount of a system memory, a load amount of a graphic processing unit, a load amount of a video memory, and a load amount of a network interface card.

5. A load distribution method used in a server/client system in which a plurality of servers and a plurality of clients are connected through a network, and the servers execute a process based on a process request from the clients and transmit a process result to the clients, comprising:

receiving information on the process from the clients through the network;

determining a server to execute the process from among the servers based on the information on the process; and transmitting the process request to the determined server, wherein the determining includes calculating, for each of the servers, a first distance from an estimation point indicating an estimated consumption to an ideal consumption line, being a normal that connects the estimation point and the ideal consumption line, the estimated consumption obtained by adding an amount of resource that has been consumed by execution of the process to a point indicating a current resource consumption for each of the servers, the ideal consumption line being a straight line that connects an origin point and a point indicating a maximum resource capacity for each of the servers expressed in a space having parameters of resource as axes; and calculating, for each of the servers, a second distance from the estimation point to the origin point, in the space, and the determining includes determining the server based on at least one of the first distance and the second distance.

6. The load distribution method according to claim 5, wherein the parameters include at least one of a load amount of a central processing unit, a load amount of a system memory, a load amount of a graphic processing unit, a load amount of a video memory, and a load amount of a network interface card.

7. A computer-readable recording medium that stores therein a load distribution program for distributing loads of servers in a server/client system in which a plurality of servers and a plurality of clients are connected through a network, and the servers execute a process based on a process request from the clients and transmit a process result to the clients, the load distribution program making the servers execute:

receiving information on the process from the clients through the network;

determining a server to execute the process from among the servers based on the information on the process; and transmitting the process request from the clients to the determined server, wherein the determining includes calculating, for each of the servers, a first distance from an estimation point indicating an estimated consumption to an ideal consumption line, the first distance being a normal that connects the estimation point and the ideal consumption line, the estimated consumption obtained by adding an amount of resource to be consumed by execution of the process to a point indicating a current resource consumption for each of the servers, the ideal consumption line being a straight line that connects an origin point and a point indicating a maximum resource capacity for each of the servers expressed in a space having parameters of resource as axes; and calculating, for each of the servers, a second distance from the estimation point to the origin point, in the space, and the determining includes determining the server based on at least one of the first distance and the second distance.

8. The computer-readable recording medium according to claim 7, wherein the parameters include at least one of a load amount of a central processing unit, a load amount of a system memory, a load amount of a graphic processing unit, a load amount of a video memory, and a load amount of a network interface card.

* * * * *